(12) United States Patent
Grun

(10) Patent No.: US 6,629,166 B1
(45) Date of Patent: Sep. 30, 2003

(54) METHODS AND SYSTEMS FOR EFFICIENT CONNECTION OF I/O DEVICES TO A CHANNEL-BASED SWITCHED FABRIC

(75) Inventor: Paul Grun, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 09/605,360

(22) Filed: Jun. 29, 2000

(51) Int. Cl.[7] .......................... G06F 3/00; G06F 13/00
(52) U.S. Cl. ................... 710/36; 710/1; 710/5; 710/8; 710/37; 710/62; 709/246; 703/25; 703/27
(58) Field of Search .............................. 710/1, 37, 36; 709/246; 703/25, 27

(56) References Cited

U.S. PATENT DOCUMENTS

| | | | | |
|---|---|---|---|---|
| 4,855,905 A | * | 8/1989 | Estrada et al. ............... | 709/246 |
| 5,313,584 A | * | 5/1994 | Tickner et al. ................ | 710/37 |
| 5,530,845 A | * | 6/1996 | Hiatt et al. .................... | 703/27 |
| 5,581,741 A | * | 12/1996 | Clark et al. ................... | 703/25 |

* cited by examiner

Primary Examiner—Jeffrey Gaffin
Assistant Examiner—Angel L Casiano
(74) Attorney, Agent, or Firm—Antonelli, Terry, Stout & Kraus, LLP

(57) ABSTRACT

Methods and systems for interfacing one or more Input/Output (I/O) controllers to a channel-based switched fabric. One or more channel adapters allow connection of the one or more I/O controllers to the channel-based switched fabric. The channel adapters support transferring of messages or data between the one or more I/O controllers and one or more initiating units connected to the channel-based switched fabric. An adaptable physical interface exists between the one or more I/O controllers and the adapters. A set of command primitives are used for communicating information between the one or more I/O controllers and the adapters via the physical interface.

38 Claims, 13 Drawing Sheets

METHODS AND SYSTEMS FOR EFFICIENT CONNECTION OF I/O DEVICES TO A CHANNEL-BASED SWITCHED FABRIC

BACKGROUND

1. Field

This invention relates to I/O device interface mechanisms, and more specifically to I/O device interface mechanisms that interface I/O devices to channel-based switched fabrics.

2. Background

A cluster may include one or more hosts connected together by an interconnection fabric. In traditional clusters, hosts have locally attached I/O controllers connected to local I/O buses. FIG. 1 illustrates a typical bus-based computer 10, which includes a processor 1 connected to a host (or processor) bus 2 and an I/O and memory controller (or chipset) 3. A local I/O bus 4 may be considered local to computer 10 because, among other factors, it is physically located within the same cabinet as the processor 1 (or within very close proximity to processor 1). Local I/O bus 4 is connected to an I/O bridge 5. Several I/O devices are attached to local I/O bus 4, including I/O controllers 6 and 7 and a Local Area Network (LAN) Network Interface Card (NIC) 8. The I/O controllers 6 and 7 may be connected to one or more I/O devices, such as storage devices, hard disk drives, or the like. I/O bus 4 is a traditional I/O bus, such as a Peripheral Component Interconnect (PCI bus), a Industry Standard Architecture (ISA) bus, or Extended ISA (EISA) bus, etc. A traditional I/O bus provides attachment points to which I/O controllers can be attached.

A bus-based computer, such as that shown in FIG. 1, has a number disadvantages and drawbacks. All of the I/O controllers on the I/O bus share the same power and clock domain and share a common address space. Due to the physical and electrical load limitations, only a relatively small number of I/O controllers may be attached to an I/O bus, and must be physically located within the same cabinet as the processor (or within very close proximity). Thus, the entire I/O bus is physically attached to a single computer system. Also, in traditional clusters, I/O controllers are not directly connected to the network or cluster, but are provided only as part of another host. Thus, the I/O controllers on the I/O bus of a computer system are directly visible (or detectable) and addressable only by that computer system or host, but are not directly visible or addressable to any other host in the cluster.

For example, I/O controllers 6 and 7 are visible only to computer 10, and are not visible or directly addressable to any other host which may be connected to LAN 11. To allow another host computer on LAN 11 (not shown) to access I/O controllers 6 and 7 of host 10, the other host on LAN 11 must communicate through processor 1 and the operating system of host computer 10 (rather than directly to I/O controllers 6 and 7).

Therefore, bus-based computer systems provide a very inflexible arrangement for I/O resources. As a result, there is a need for a technique that provides a much more flexible arrangement for I/O devices for computer systems.

BRIEF DESCRIPTION OF THE DRAWINGS

The present invention is further described in the detailed description which follows in reference to the noted plurality of drawings by way of non-limiting examples of the present invention in which like reference numerals represent similar parts throughout the several views of the drawings and wherein.

DETAILED DESCRIPTION

Figure 1:
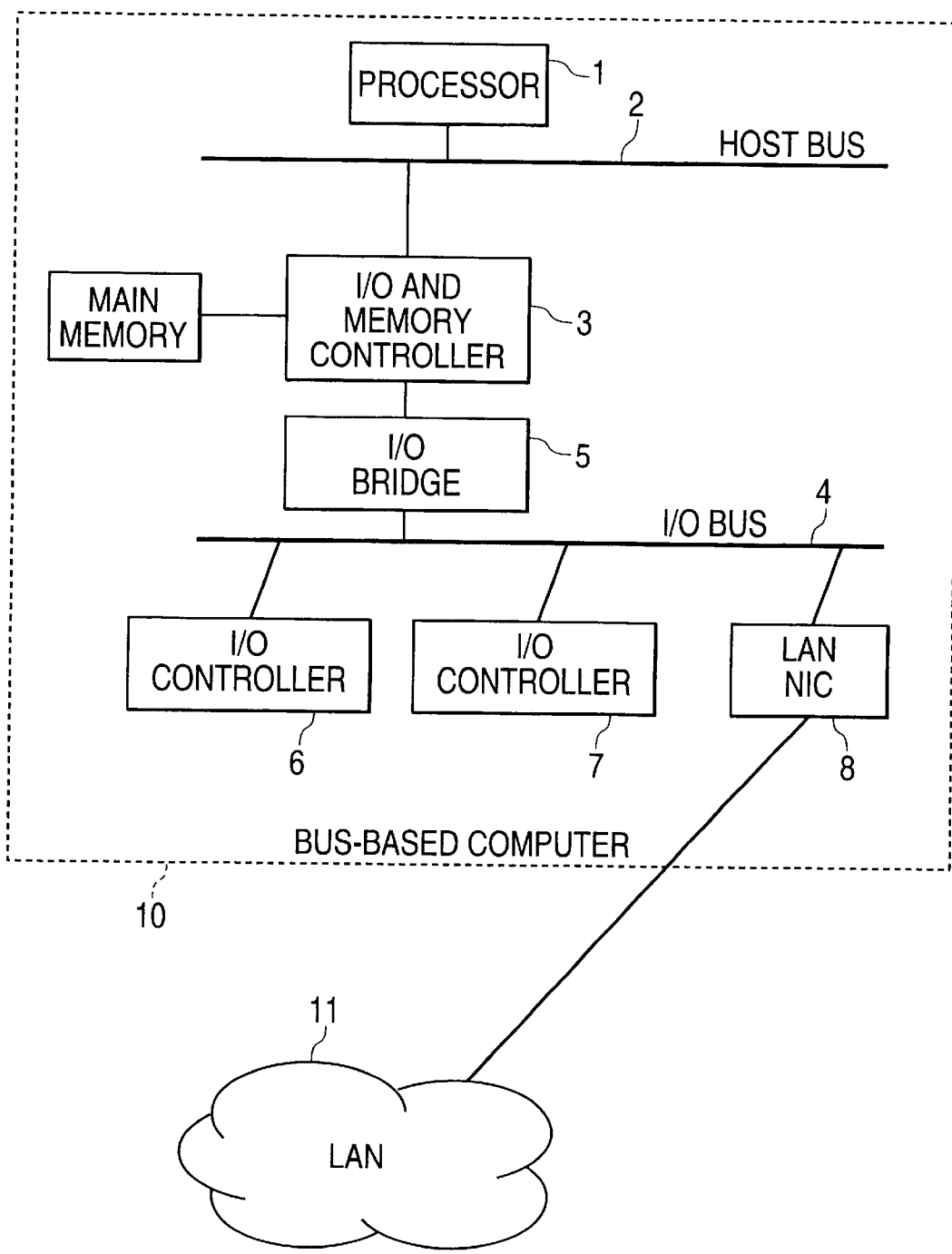
FIG. 1 illustrates an example bus-based computer.

The particulars shown herein are by way of example and for purposes of illustrative discussion of example embodiments of the present invention. The description taken with the drawings make it apparent to those skilled in the art how several example forms of the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention will be described using an example system block diagram in an example personal computer (PC) environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention is directed to a method for interfacing at least one Input/Output (I/O) controller to a channel-based switched fabric that includes: providing at least one channel adapter where the at least one channel adapter allows connection of the at least one I/O controller to a channel-based switched fabric and the at least one channel adapter supports transferring of messages and/or data between the at least one I/O controller and at least one initiating unit connected to the channel-based switched fabric; providing a physical interface between the at least one I/O controller and the at least one channel adapter; and defining a set of command primitives where the command primitives communicate information between the at least one I/O controller and the at least one channel adapter via the physical interface.

The transferring of messages from one of the at least one initiating unit to one of the at least one I/O controller may include: allocating at least one buffer to receive inbound messages where the allocation may be performed by the one of the at least one I/O controller; passing control of the at least one buffer from the one of the at least one I/O controller to the channel adapter; receiving an inbound message where the inbound message may be received by the channel adapter from the one of the at least one initiating unit; storing the inbound message in one of the at least one buffer; and passing control of the one of the at least one buffer from the channel adapter to the one of the at least one I/O controller.

The transferring of messages from one of the at least one I/O controller to one of the at least one initiating unit may include: constructing a message in at least one buffer where the constructing may be performed by the one of the at least one I/O controller; passing control of the at least one buffer from the one of the at least one I/O controller to the channel adapter; transferring the message to the one of the at least one initiating unit by the channel adapter; and passing control of the at least one buffer from the channel adapter to the one of the at least one I/O controller.

The transferring of data may include: passing control of at least one block of memory in one of the at least one initiating unit to one of the at least one I/O controller; transferring the data between the one of the at least one initiating unit and the one of the at least one I/O controller where the data may be transferred from the at least one block of memory or to the at least one block of memory; and passing control of the at least one block of memory from the one of the at least one I/O controller to the one of the at least one initiating unit. The transferring of data may include: passing control of at least one block of memory in one of the at least one I/O controller to one of the at least one initiating unit; transferring the data between the one of the at least one initiating unit and the one of the at least one I/O controller where the data may be transferred from the at least one block of memory or to the at least one block of memory; and passing control of the at least one block of memory from the one of the at least one initiating unit to the one of the at least one I/O controller.

The transferring of data may include: loading the data in at least one buffer in one of the at least one initiating unit; sending the data from the buffer to one of the at least one I/O controller; and receiving the sent data at the one of the at least one I/O controller. The transferring of data may include: loading the data in at least one buffer in one of the at least one I/O controller; sending the data from the buffer to one of the at least one initiating unit; and receiving the sent data at the one of the at least one initiating unit. The channel adapter may be a part of an I/O unit. The at least one I/O controller may be a part of an I/O unit.

The present invention may include providing a unit management service (UMS) where the UMS may be a part of the channel adapter. The UMS may manage initialization operations, discovery operations, and/or connection configuration operations related to the at least one I/O controller, the channel adapter, and/or the I/O unit. The present invention may include providing a message and data service (MDS) where the MDS may be a part of the channel adapter. The MDS may perform the transferring of messages and/or data between the at least one I/O controller and the at least one initiating unit.

The physical interface may be adaptable to the at least one I/O controller. The command primitives may be adaptable to the at least one I/O controller and the transferring of at least one of messages and data. The at least one I/O controller, the physical interface, and/or the at least one channel adapter may detect errors that occur during the communicating of information between the at least one I/O controller and the at least one channel adapter. The at least one channel adapter may detect errors that occur during the transferring of messages and/or data between the at least one I/O controller and the at least one initiating unit. The at least one channel adapter may report errors detected to the at least one I/O controller.

The present invention may also be directed to a method for interfacing at least one Input/Output (I/O) controller to an adapter where the at least one I/O controller may be part of an I/O unit. The adapter may provide an interface for the I/O unit to a channel-based switched fabric that includes: executing initialization operations related to the at least one I/O controller and the adapter; executing discovery operations related to the at least one I/O controller and the adapter; establishing a connection configuration between at least one initiating unit and the I/O unit; sending an I/O service request from the at least one initiating unit to the I/O unit; transferring messages and/or data between the at least one initiating unit and the at least one I/O controller; and sending an I/O completion message from the at least one I/O unit to the at least one initiating unit after completion of the transferring. The first sending, transferring, and second sending may occur across a channel-based switched fabric.

The I/O service request may include: an I/O controller identification for one of the at least one I/O controller; an initiating unit identification for one of the at least one initiating unit; and at least one pointer to at least one buffer in the one of the at least one initiating unit where the at least one pointer may be used by the one of the at least one I/O controller to identify where to transfer data to or transfer data from the at least one buffer.

The present invention may further be directed to a method for interfacing at least one Input/Output (I/O) controller to an adapter where the at least one I/O controller and the adapter are part of an I/O unit. The adapter provides an interface for the at least one I/O controller to a channel-based switched fabric and includes: providing a physical interface between the at least one I/O controller and the adapter where the physical interface is adaptable to the at least one I/O controller; defining a set of command primitives where the command primitives communicate commands between the at least one I/O controller and the adapter and the command primitives are transferred between the at least one I/O controller and the adapter via the physical interface; providing a unit management service (UMS) where the UMS is a part of the adapter and the UMS manages initialization operations, discovery operations, and/or connection configuration operations related to the at least one I/O controller, the adapter, and/or the I/O unit; and providing a message and data service (MDS) where the MDS is a part of the adapter and the MDS supports transferring of messages and/or data between the at least one I/O controller and at least one initiating unit connected to a channel-based switched fabric.

The initialization operations may include: initializing the physical interface between each at least one I/O controller and the adapter; naming each at least one I/O controller; and/or initializing each at least one I/O controller. The discovery operations may include: retrieving a unit profile for the I/O unit where the unit profile information may be retrieved by the adapter and sent to at least one I/O resource manager and each at least one I/O resource manager may be part of the at least one initiating unit; retrieving a controller list for the I/O unit where the controller list may be retrieved by the adapter and sent to the at least one I/O resource manager; and/or retrieving an I/O controller profile for each at least one I/O controller where each I/O controller profile may be retrieved by the adapter and sent to the at least one I/O resource manager.

The connection configuration may be established by: establishing a unit control connection between the I/O unit and an I/O resource manager where the I/O resource manager may be part of the at least one initiating unit; and/or creating service connections between at least one driver of the at least one initiating unit and the at least one I/O controller. The unit control connection may be destroyed upon completion of the creating service connections. The service connections may include channels in the channel-based switched fabric where the channels handle the transferring of messages and/or data between the at least one initiating unit and the at least one I/O controller. The service connections may be used for the transferring of messages only. The service connections may be used for the transferring of data only. The destroying may be initiated by the I/O resource manager. The destroying may be initiated by the I/O unit. The destroying may be initiated when the at least one I/O controller decides to abandon use of the service connections. The destroying may be initiated when the I/O adapter detects errors on the service connection.

The creating may include: determining a message queue size of a message queue in the I/O unit where the message queue may be capable of buffering messages transferable between one of the at least one I/O controller and one of the at least one initiating unit; determining a data queue size of a data queue in the I/O unit where the data queue may be capable of buffering data transferable between the one of the at least one I/O controller and the one of the at least one initiating unit; and sending the message queue size, the data queue size, and/or an initiating unit identification for the one of the at least one initiating unit to the one of the at least one I/O controller.

The present invention includes a system for interfacing at least one Input/Output (I/O) controller to a channel-based switched fabric that includes: at least one I/O controller; at least one initiating unit connected to a channel-based switched fabric; at least one channel adapter, the at least one channel adapter allowing connection of the at least one I/O controller to a channel-based switched fabric where the at least one channel adapter supports transferring of messages and/or data between the at least one I/O controller and the at least one initiating unit; and a physical interface between the at least one I/O controller and the at least one channel adapter where the physical interface allows transferring of command primitives that communicate information between the at least one I/O controller and the at least one channel adapter via the physical interface.

The channel adapter may be part of an I/O unit. The channel adapter may include a unit management service (UMS) where the UMS manages initialization operations, discovery operations, and/or connection configuration operations related to at least one of the at least one I/O controller and the adapter. The channel adapter may include a message and data service (MDS) where the MDS performs the transferring of messages and/or data between the at least one I/O controller and at least one initiating unit.

The present invention also includes an Input/Output (I/O) unit that includes: at least one I/O controller; at least one channel adapter where the at least one channel adapter allows connection of the at least one I/O controller to a channel-based switched fabric and the at least one channel adapter supports transferring of messages and/or data between the at least one I/O controller and at least one initiating unit connected to a channel-based switched fabric; and a physical interface between the at least one I/O controller and the at least one channel adapter where the physical interface allows transfer of command primitives that communicate information between the at least one I/O controller and the at least one channel adapter via the physical interface. The channel adapter may include a unit management service (UMS) where the UMS manages initialization operations, discovery operations, and/or connection configuration operations related to at least one of the at least one I/O controller and the adapter. The channel adapter may include a message and data service (MDS) where the MDS performs the transferring of messages and/or data between the at least one I/O controller and at least one initiating unit.

The present invention relates to an interface between a channel adapter and a I/O device which allows the I/O device easy access to the services provided by the channel adapter. The channel adapter may be part of an I/O unit that interfaces to one or more host devices via a channel-based switched fabric. The host device may include one or more devices or applications that serve as initiators of data or message transfers between the host device and the I/O unit. The I/O unit receives requests from the initiators via the channel adapter and passes these along to one or more I/O controllers that control I/O devices attached to the I/O unit. The I/O controllers, also known as targets, use the channel adapter (target channel adapter or TCA) to enable the transfers to the initiators in the host unit. The present invention relates to the interface between I/O controllers and a target channel adapter.

Figure 2:
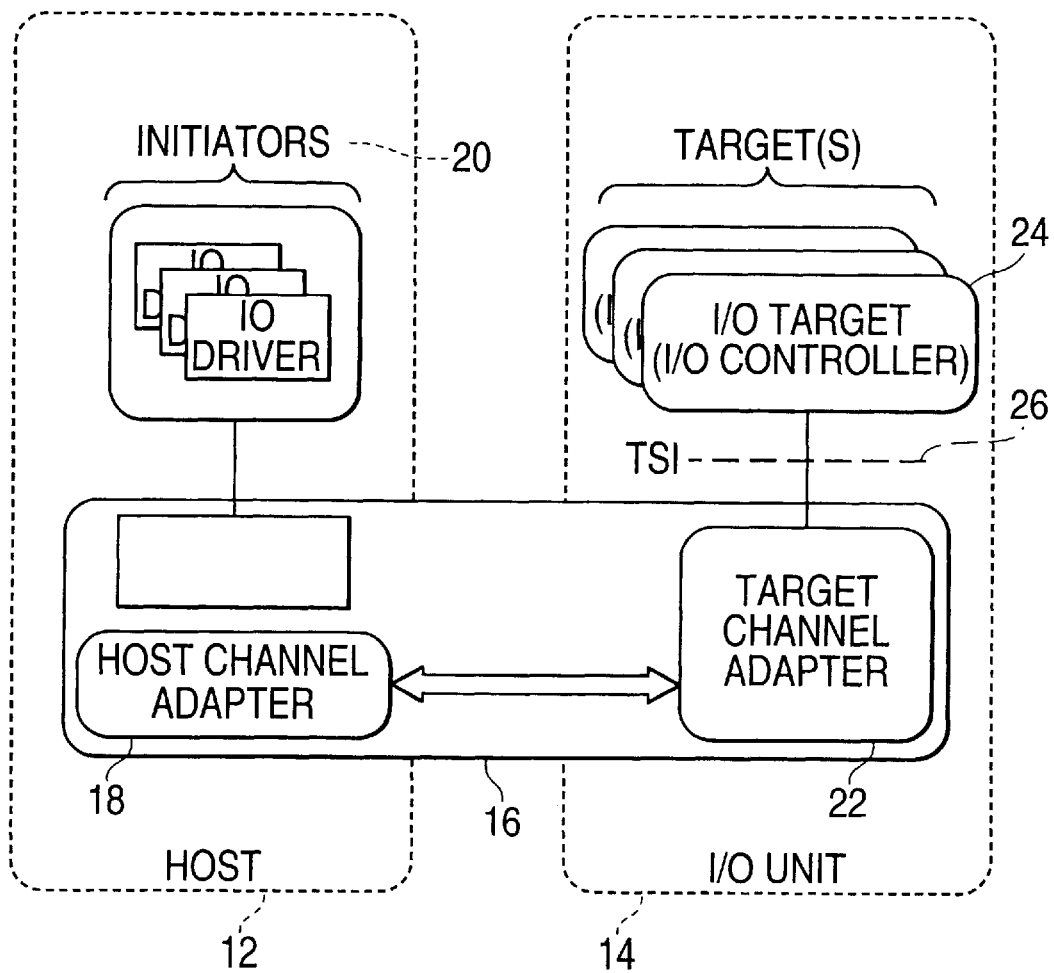
FIG. 2 is an example system showing a single host and a single I/O unit according to an example embodiment of the present invention.

FIG. 2 shows an example system according to the present invention of a single host and a single I/O unit. As shown in FIG. 2, a host unit 12 may be connected to an I/O unit 14 via a channel-based switched fabric 16. The host unit 12 communicates with I/O unit 14 using a host channel adapter 18. The host channel adapter 18 may communicate with the I/O unit 14 across the switched fabric by connecting to a target channel adapter (TCA) 22. Host channel adapter 18 interfaces to one or more initiators 20. These initiators may be processing units or software applications. The initiator may be any other mechanism for initiating message or data transfers between the host and one or more I/O units, and still be within the spirit and scope of the present invention. Target channel adapter 22 interfaces with one or more I/O controllers 24 in the I/O unit 14. I/O controllers 24 control one or more I/O or peripheral devices external to the I/O unit. Target channel adapter 22 interfaces with I/O controllers 24 by a target service interface (TSI) 26. The target service interface 26 defines primitives or commands that allow communication of messages and data between I/O controllers and initiators in the host.

Therefore, an initiator may be a-process that generates requests for I/O services from an I/O unit. The I/O controller may also be connected to a network whereby an initiator may request services, via the I/O unit, to transfer or receive data across a network attached to an I/O controller. The I/O controller may be connected to any type of network (e.g., LAN, WAN, WLAN) and still be within the spirit and scope of the present invention. The I/O devices, networks, or peripheral devices attached to each I/O controller are not shown in FIG. 2. The initiators initiate requests for I/O services from the I/O units, however, are not aware of the details of how the messages and/or data are being transported. A target service interface according to the present invention defines how messages and data are transferred between an I/O controller and an initiator.

Figure 3:
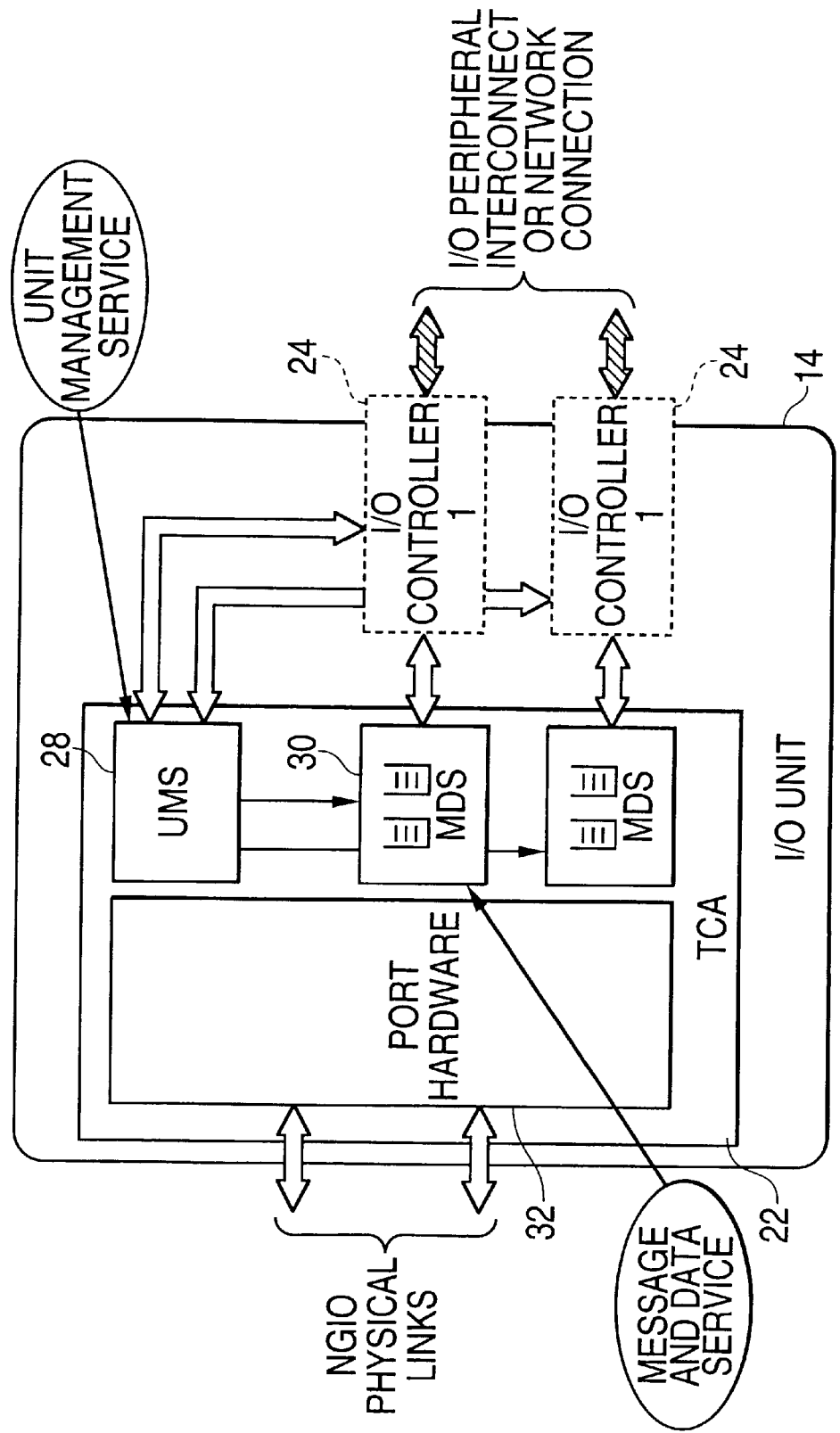
FIG. 3 shows a block diagram of an example I/O unit according to an example embodiment of the present invention.

FIG. 3 shows a block diagram of an example I/O unit according to the present invention. I/O unit 14 may include a target channel adapter 22 (TCA), one or more I/O controllers 24, as well as unit management services (UMS) 28, and message and data services (MDS) 30. The unit management service 28 and message and data service 30 may include devices and/or applications that aid in the transfer of messages and data between an I/O controller 24 and an initiator 20. Message and data service 30 (MDS) may provide basic messaging and data transfer services to I/O controller 24. Unit management service 28 (UMS) may support the I/O unit as a whole by managing a variety of discovery, configuration, and connection management details needed to make an I/O unit operate. Unit management service 28 and message and data service 30 are each connected to all I/O controllers 24 that are part of I/O unit 14. Unit management service 28 and message and data service 30 may also be interconnected. Target channel adapter 22 interfaces with the channel-based switch fabric via port hardware 32. This port hardware 32 may consist of any of many well known ways and devices of interfacing to a channel-based switch fabric. An initiator 20 uses the services of the channel-based switch fabric to send a request for I/O services to an I/O controller 24. The I/O controller 24, in turn, uses the services of the channel-based switched fabric to fulfill that request and to notify the initiator 20 that the request has been completed. For example, an initiator may request that an I/O controller transmit or receive network packets, such as Ethernet packets, for storage and retrieval from/to a storage media such as a disk or tape drive.

A target channel adapter may be described as logical since it may be physically partitioned into a number of discrete units to satisfy a given application. The target channel adapter 22 may be managed by unit management service 28 as a single logical entity. A target service interface according to the present invention defines an interface between a target channel adapter 22 and one or more I/O controllers 24. This definition represents a standard way for an I/O controller 24 to access the message and data services provided by a target channel adapter 22. A target service interface according to the present invention defines a set of primitive commands that may be transported across a physical interconnect. Each such primitive may have a prescribed effect and produces a predictable result. The physical interconnect may be any physical means of implementing the interface and still be within the spirit and scope of the present invention. For purposes of illustrating the present invention, a physical interconnection between a target channel adapter 22 and its attached one or more I/O controllers 24 is defined as a layer called a service hardware interface (SHIF). The SHIF physical interface abstracts the details of the physical connection between a TCA 22 and I/O controllers 24. This abstraction allows construction of different types of I/O units, all of which are compatible with a target service interface according to the present invention, but which may implement different physical topologies.

Although physical implementation of the service hardware interface may vary, to support a target service interface according to the present invention, it is desirable that the service hardware interface have certain features. A nonexhaustive listing includes: providing a register level mechanism for use by the unit management service in assigning a name (e.g., IOC_ID) to each I/O controller; providing a mechanism for mapping the IOC_IDs to specific physical I/O controllers; providing a mechanism for alerting a unit management service to changes in the power state for the I/O controller; providing a mechanism to alert a unit management service of the arrival or departure of an I/O controller; supporting a register level interface that may include, but is not limited to, an I/O controller count register, interface controller register, interface status register, and/or interface IOC_ID read/write register; providing the capability of mapping logical addresses to physical addresses for functional operations; capability of mapping remotely supplied memory references to the I/O controllers memory address base; the capability to detect and report errors that prevent it from accessing the I/O controllers local memory address space; and supporting the transport of target service interface primitives, for example equating a service connection ID (SC_ID) to a specific I/O controller, and to a memory location within that I/O controller.

Figure 4:
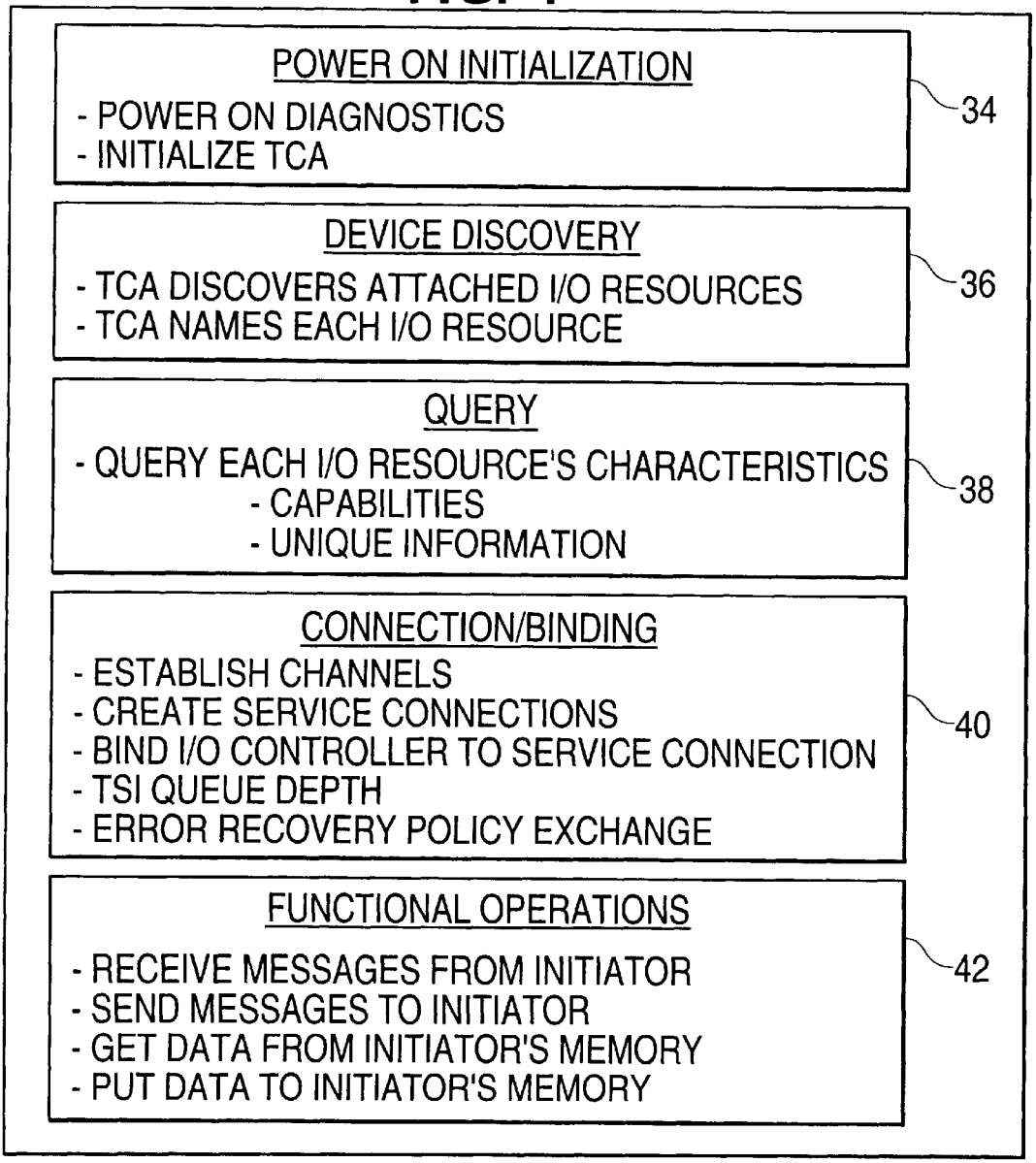
FIG. 4 shows a block diagram of an overview of example activities performed by a target service interface according to an example embodiment of the present invention.

FIG. 4 shows a block diagram of an overview of example activities performed by a target service interface according to the present invention. These activities describe activities that may transpire between a target channel interface and an I/O controller. Some of these activities are performed independent of an initiator request, however, the majority are performed in response to a request received over a channel-based switched fabric from an initiator. As shown in FIG. 4, activities that may be performed using a target service interface according to the present invention include: power on initialization 34, device discovery 36, query 38, connection/binding 40, and/or functional operations 42.

Poweron initialization activities 34 may include: poweron diagnostics and initialization of the target channel adapter. Device discovery activities 36 may include the target channel adapter discovery and identifying of any attached I/O resources, and naming any discovered I/O resource by giving it an ID or other name. The I/O controller's name or ID may be used to identify which I/O controller is to receive the request from an initiator. The name or ID assigned to an I/O controller may or may not relate to a physical address of the I/O controller. An I/O controller's identification (IOC_ID) may be arbitrarily assigned and remain constant as long as that particular I/O controller is powered up and active. However, should the I/O controller be powered down and then later returned to service, the target channel adapter may assign a new ID to the I/O controller, or it may reassign the same ID. The target channel adapter may also discover the total number of I/O controllers that may be attached to this target channel adapter. This information may be provided to the initiators.

The query activity 38 may include the ability of a target channel adapter to provide the initiators with a mechanism to receive detailed information about I/O resources provided by the I/O controllers and supported by the I/O unit. This may allow allocations of an I/O unit's resources to various initiators connected to the channel-based switched fabric, and provide enough details to ensure connections may be established to the I/O controllers. The target channel adapter may use target service interface primitives to extract this information and provide it to the one or more initiators.

The connection/binding activities 40 refer to processes of creating channels, binding the channels into service connections, and binding the I/O controllers to the service connections. At the conclusion of this activity there exists a service connection between an initiator on one end and an I/O controller on the other end. The number of channels that may comprise a service connection may not be visible or known to the initiator or the I/O controller. Further, the channels that may comprise a service connection may be used in different ways which may be defined at the time the connection is established.

Functional operations activities 42 describe the way that initiators and I/O controllers may use the services of a target channel adapter to transfer messages and data. These messages and data generally relate to providing I/O services, (e.g., request to transfer blocks of data to or from a storage device, transfer of storage data, control network traffic, and the actual network traffic itself). Although two terms may be used by a target service interface to describe the transfer of information, e.g., messages and data, these terms do not describe the content of the information being moved. For example, an I/O unit dedicated to networking may use a message for the transport of packets of network traffic data.

Transport of messages and/or data between initiators and I/O controllers will generally use a message-based system. In a message passing information transfer system, there are many protocols or models that may be followed. For example, an initiator that requests an I/O controller to move data from or to the initiator's memory, may give the I/O controller control of the initiator's memory space. The I/O controller would then manage the transfer by either pushing data in or pulling data out of the initiator's memory. At the conclusion of the data transfer, the I/O controller would pass control of the memory back to the initiator. Further, a second model may include the I/O controller passing control of its memory to an initiator. In this example, the initiator then would push or pull data from or to the I/O controller's memory, and at the conclusion of the transfer, pass control of the memory back to the I/O controller. Another model may include message passing where neither an initiator nor an I/O controller gives control of its memory space to the other. In this example an initiator may define a block of data that requires transfer and then push the data to the I/O controller. Or an I/O controller may define a block data in its memory and push that data to an initiator. In this example, neither initiator or an I/O controller has exposed its internal memory to the other.

Functional Operation

An initiator may be a processor application, such as an I/O driver, running on a host or server. In order to supply I/O services, an I/O controller may need a method to send and receive messages to and from an initiator and a method to transfer data into and out of an initiator's memory. A target service interface according to the present invention provides an interface by which an I/O controller may access the message and data services provided by a target channel adapter. A target service interface according to the present invention may include: a set of service connections which may be used to transfer messages and data between an I/O controller and an associated initiator, primitives which are commands that may control the traffic traversing the service connection, and a set of semantics describing the usage and maintenance of the target service interface. There may be many types of primitives or commands used to support a target service interface according to the present invention. These primitives may be specific to the I/O controllers that are attached to an I/O unit, or specific to the types of information transfer between an initiator and an I/O controller. Therefore, a target service interface according to the present invention may include primitives which support I/O controller initialization and configuration, the transferring of message and data traffic, and utility primitives (e.g., diagnostic and/or customized primitives based on the I/O controller). Initiators and I/O controllers may be considered to be "clients" of a switched fabric. A target channel adapter is merely part of the conduit for conducting messages and data between the two clients. A target service interface according to the present invention implements an interface exposed to an I/O controller which allows a controller to access the services of a channel-based switched fabric subsystem for transporting messages and data. An I/O controller may use a target channel adapter's data transfer service by creating an object which identifies a data object to be transferred including its location and length, the identity of the initiator expressed in terms of the service connection ID, and addressing information representing the destination in the initiator's memory space. The data object is passed by an I/O controller to the message and data service as parameters to a target service interface primitive. Once the message and data service has completed the requested data transfer it returns a target service interface primitive to the I/O controller thus completing the data transfer operation.

A service connection is an abstraction presented to the I/O controller by a target channel adapter for the purpose of moving messages and data between an I/O controller and an initiator. In order to conduct the transfer of messages and data across a channel-based switch fabric, a target channel adapter may create a collection of one or more channels- which are presented collectively to the I/O controller as a service connection, and which may be referred to by both the target channel adapter and the I/O controller by a service connection ID, i.e., (SC_ID). A target channel adapter message and data service may determine how to transport messages and data across a channel-based switch fabric based on the number of channels comprising the service connection and/or whether the information being transported is a message or data. Generally, an I/O controller may use a message primitive or a data primitive to define the type of traffic to be transported. However, as noted previously, data may be transferred using message primitives and messages transferred via data primitives and still be within the spirit and scope of the present invention. A service connection may include one or more channels. A number of channels and usage of those channels may be determined at connection establishment time. If a service connection includes only a single channel, that channel may be used to transfer both message and data traffic. However, if on the other hand the service connection comprises several channels, then zero or one of those channels may be dedicated to transferring message traffic while the balance of the channels may be dedicated to data traffic. If a service connection contains multiple channels dedicated to data transfer, the message data service may determine how the data is transferred across the various channels.

Figure 5:
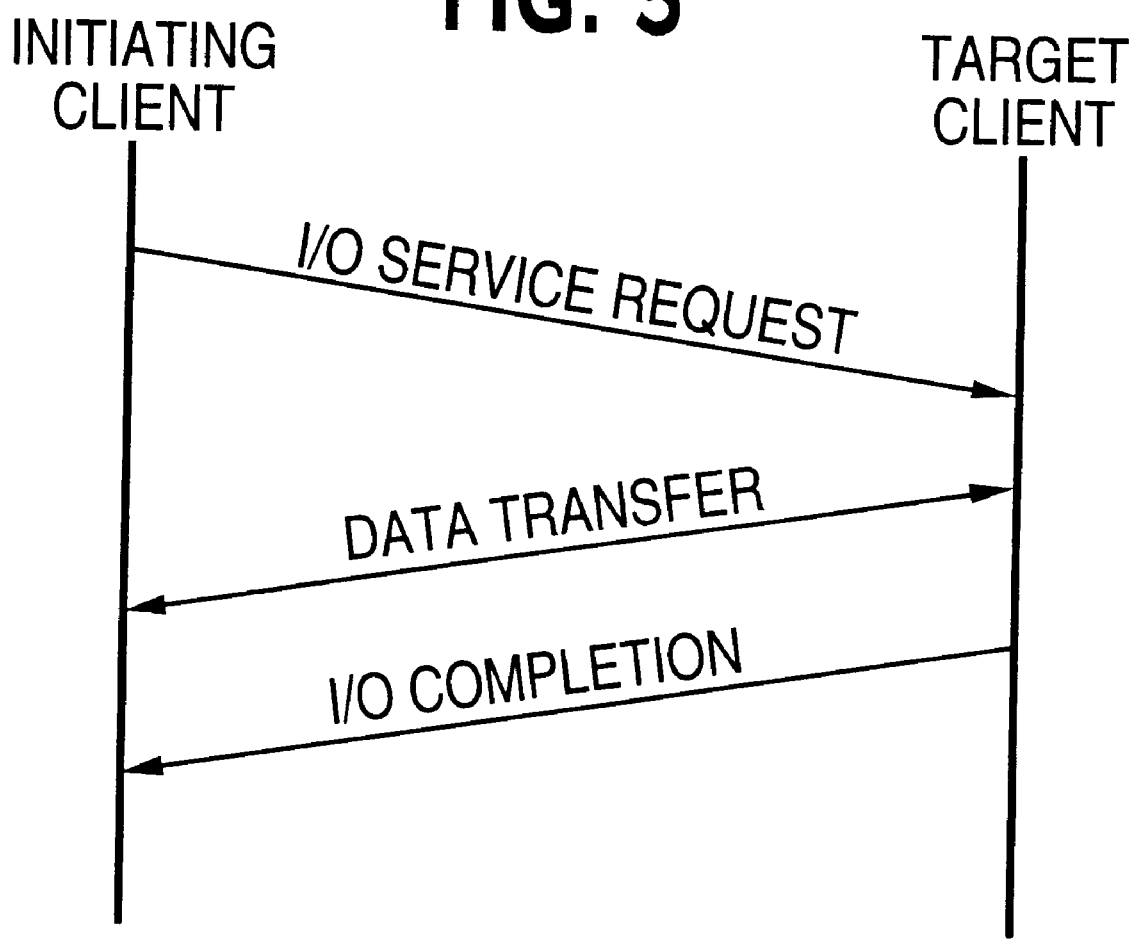
FIG. 5 shows an example I/O transaction model according to an example embodiment of the present invention.

FIG. 5 shows an example I/O transaction model according to the present invention. An initiator (initiating client) may initially send an I/O service request message to an I/O controller-(target client). An I/O controller may then transfer data between the initiator and the I/O controller. Upon completion of the transfer, the I/O controller may then send a message to the initiator notifying the initiator that the information transfer has been completed. Specifically, this may include an I/O service request transferring from the initiator a set of pointers to a pool of buffers owned by the initiator. Thus, transferring control of the buffers to the I/O controller. The I/O controller may then use these pointers to transfer data to or from the pool of buffers. An I/O completion message from the I/O controller to the initiator may then pass control of these buffers back to the initiator. The pointers may be considered tokens representing buffer ownership. This illustrates only one of many possible transaction models. Other transaction models may be used and still be within the spirit and scope of the present invention.

Prior to receiving a message, such as an I/O service request from an initiator, an I/O controller may allocate buffers to receive those inbound messages. Having allocated one or more message buffers, an I/O controller may then pass pointers to those buffers and thus control of the buffers to a message and data service using a target service interface primitive. Each primitive may pass control of one or more buffers. When an inbound message is received the message data service may select a first pointer from the list and use it to fill the message buffer. Once a complete message has been received, a message and data service may then pass the pointer back to an I/O controller via a target service interface primitive.

In order to send a message, an I/O controller may first construct the message in a message buffer. Having created the message, an I/O controller may then pass a pointer, and the control of the buffer, to the message and data service via a target service interface primitive. On receiving this primitive, a message and data service may queue an operation in order to transfer the message across the channel-based switch fabric. Once the transfer completes, the message and data service may then return control of the buffer to the I/O controller for reuse by returning a target service interface primitive thereby completing transfer of the message. Therefore, pointers to message buffers may be passed back and forth between I/O controllers and a message and data service using target service interface primitive messages.

Figure 6:
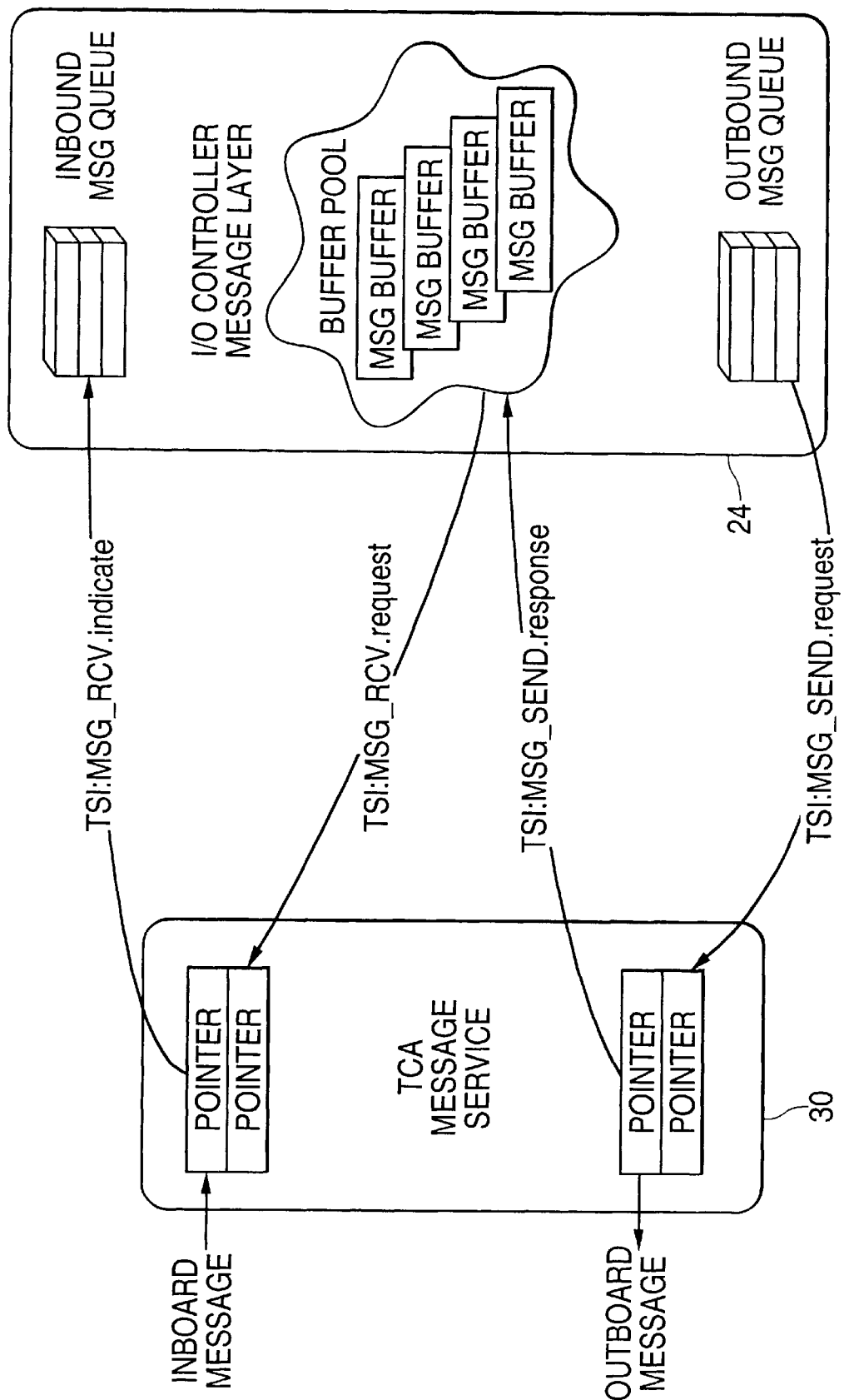
FIG. 6 shows an illustration of how target service interface primitives may be used according to an example embodiment of the present invention.

FIG. 6 shows an illustration of how target service interface primitives may be used for this purpose. A service connection represents a pipe to a particular initiator. Therefore, each service connection between an I/O controller and an initiator is specific to those particular devices. An initiator may be an I/O driver located on the same host or an I/O driver located on different host. When message buffers are passed back and forth between an I/O controller and a memory data service, they are associated with a certain service connection via a service connection ID field (SC_ID) giving the I/O controller and the message data service a convenient method to associate messages with a specific initiator. When an inbound message arrives on a particular channel including the service connection, the message data service associates the inbound message with a given service connection and uses the next empty message buffer queued on that service connection to receive it. When message transfer is complete, the message data service returns the full buffer to the I/O controller registered to that service connection. The commands shown between the message and data service 30 and the I/O controller 24 are example target service interface primitives (discussed in more detail later) that facilitate the buffer control passing. Each message primitive may contain a buffer ID field and a service connection ID field. The buffer ID field may contain sufficient information to enable a target channel adapter to accurately reference the buffer but does not necessarily contain a physical buffer address. The creation of a physical buffer address, if one exists, and facilities for physical movement of the message data are left to the physical implementation of a target service interface according to the present invention.

Figure 7:
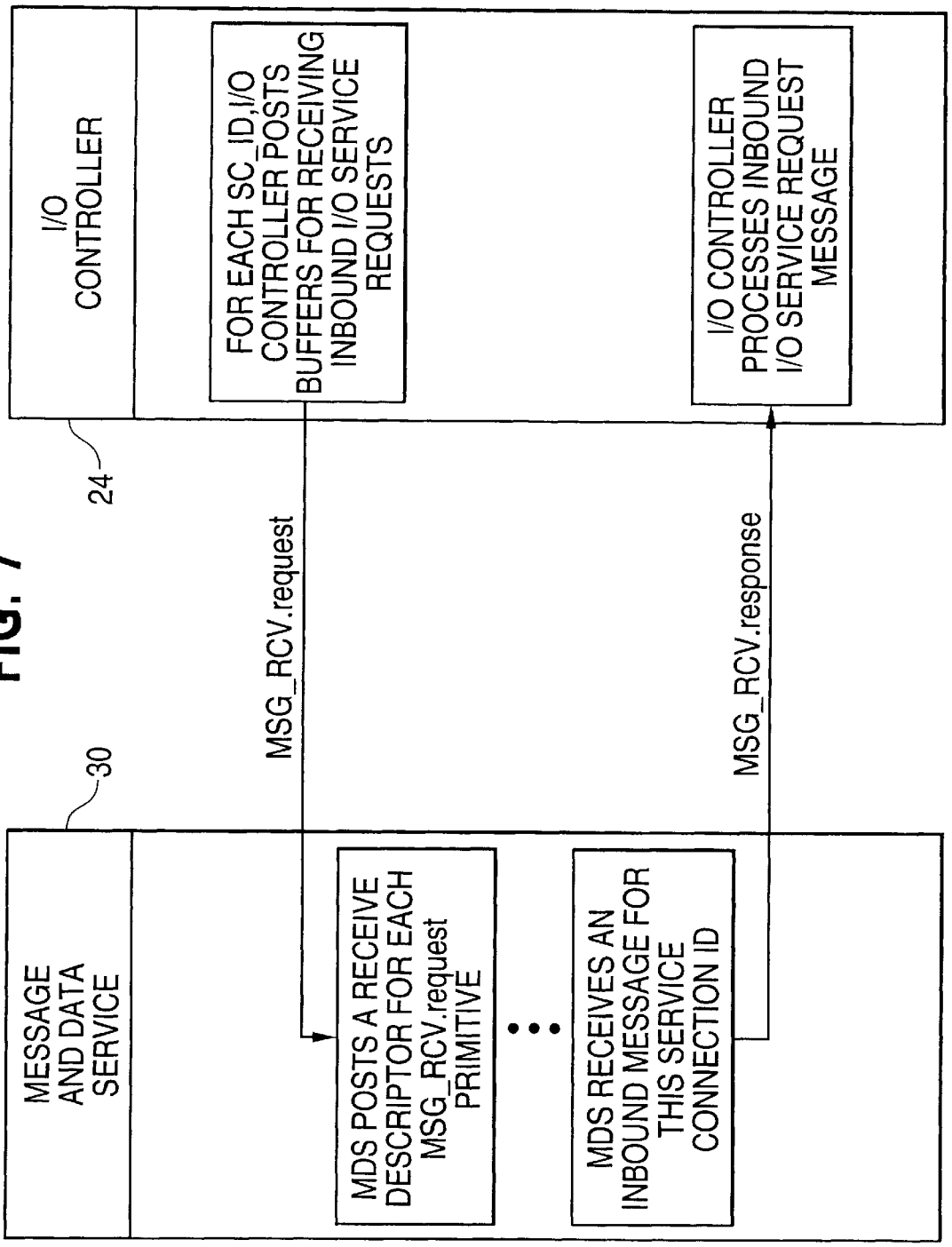
FIG. 7 shows a block diagram of an example process of receiving an inbound message according to an example embodiment of the present invention.

FIG. 7 shows a block diagram of an example process of receiving an inbound service request from an initiator according to the present invention. I/O controller 24 allocates buffers for each initiator that may send a message to the I/O controller. An I/O controller 24 sends a primitive (MSG_RCV.request) to the message and data service 30 which supplies the message and data service with pointers to these buffers. When a message is received from an initiator by the message and data service, the message and data service transfers this message to the buffer contained in the I/O controller. The message and data service may then notify the I/O controller that a message has been received. The I/O controller may then process the inbound I/O service request from the initiator.

Figure 8:
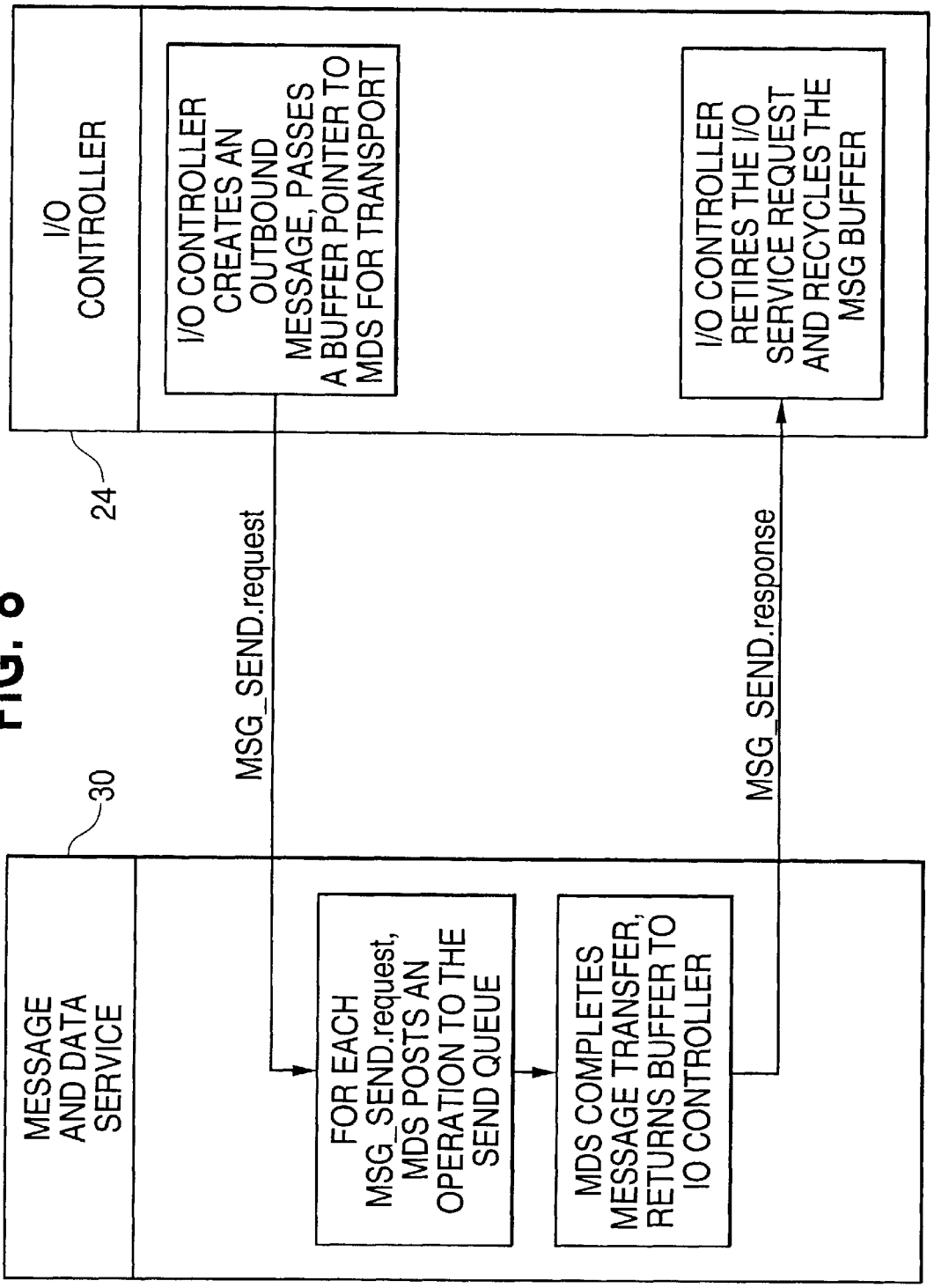
FIG. 8 shows a block diagram of sending an outbound message according to an example embodiment of the present invention.

FIG. 8 shows a block diagram of an example process of sending an outbound message to an initiator according to the present invention. An I/O controller creates an outbound message in a buffer located in the I/O controller, and passes a pointer to this buffer to the message and data service. The message and data service then sets up for sending the message across the channel-based switched fabric, and takes the data from the buffer in the I/O controller. Upon completion of the transfer, the message and data service returns control of the buffer to the I/O controller. The I/O controller then recycles the message buffer for later use.

Figure 9:
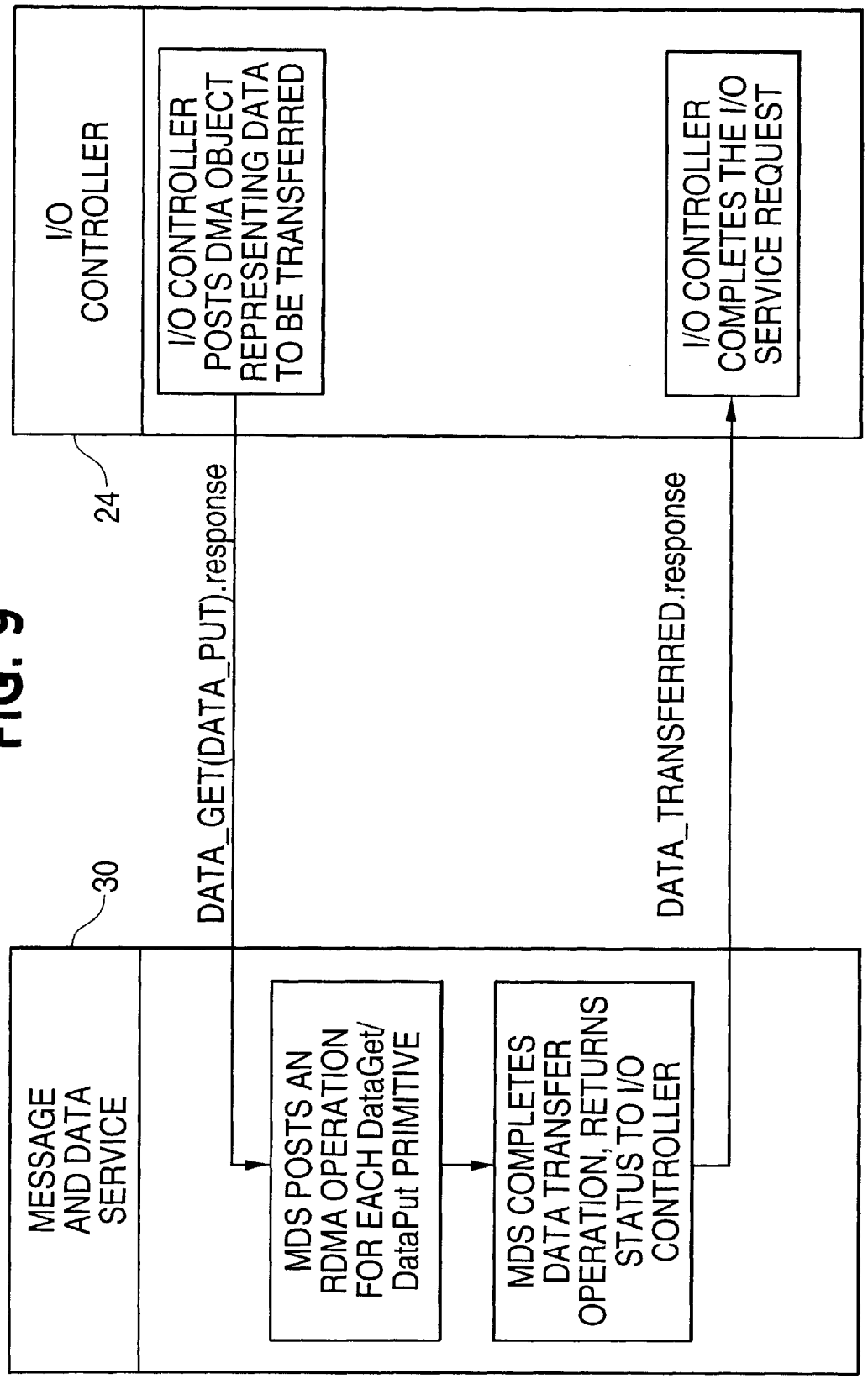
FIG. 9 shows an example block diagram of data transfer according to an example embodiment of the present invention.

FIG. 9 shows a block diagram of an example data transfer according to the present invention. An I/O controller, after having received a request from an initiator, posts an object representing data to be transferred with the message and data service. The message and data service then sets up for transfer of information across the channel-based switch fabric. The message and data service upon completion of the data transfer returns status to the I/O controller that data has been transferred. The I/O controller then notifies the initiator that the data transfer has been completed. The number of I/O service requests that an initiator may have outstanding at any particular time may be a function of the number of devices supported by the I/O controller, the depth of a command queue supported by the I/O controller itself, the depth of a command queue located on the initiators themselves, and/or the number of initiators supported by an I/O controller.

Management Functions

As noted previously, one of the activities that a target service interface according to the present invention performs are management functions. These may include power on and discovery of an I/O unit, querying of the capabilities of the I/O unit, diagnostic support, and/or connection management. Power on and discovery activities are actions that may occur between the target channel adapter and an I/O controller when the I/O unit or one of its components undergoes a power state change. A power state change may include, for example, a transition from the powered off to the powered on state, a reset of one of the elements of the I/O unit, and/or activities related to failing over channels from one port or switched fabric to another port or switched fabric.

Query is the method by which various initiating initiators discover the I/O resources contained in an I/O unit such that these resources may be assigned to appropriate I/O drivers of the initiators. Creation and management of connections refers to the process of configuring an I/O controller and the target channel adapter to create connections between an initiator and an I/O controller. This also includes maintenance of those connections and their eventual destruction. A service hardware interface (SHIF) may be responsible for notifying unit management service of changes in the state of the I/O controllers. The unit management service once notified then notifies the appropriate system agents of any change of state for an I/O controller. The service hardware interface also may correlate an I/O controller ID to a specific physical location and assign a physical memory space on the I/O controller. The I/O controller ID may be used by a unit management service to direct target service interface primitives to the appropriate physical I/O controller.

Figure 10:
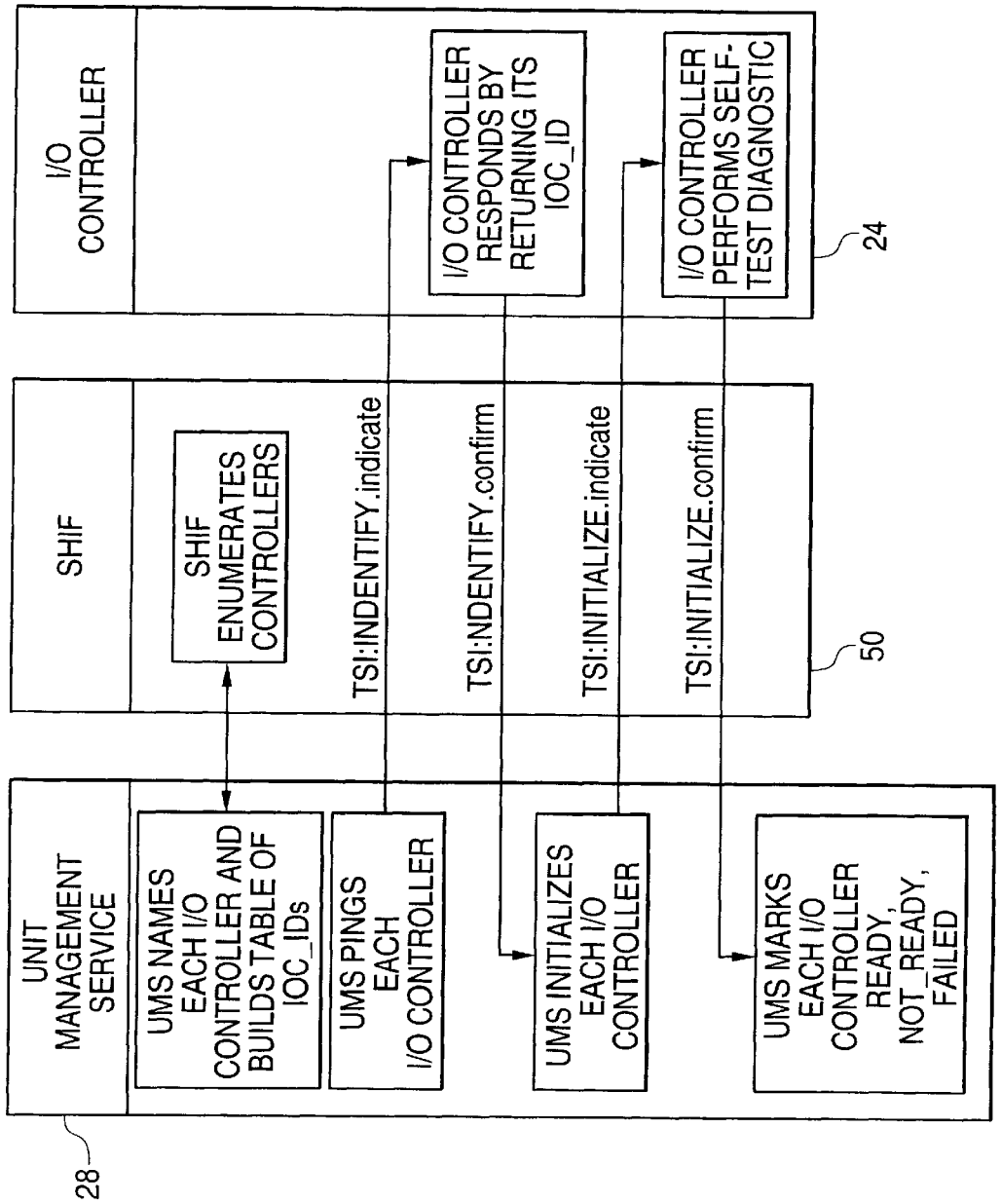
FIG. 10 shows a block diagram of example target service interface primitive sequences for initializing I/O controllers according to an example embodiment of the present invention.

FIG. 10 shows a block diagram of example target service interface primitive sequences for initializing I/O controllers. A unit management service 28 names each I/O controller 24 and builds a table of I/O controller IDs. This occurs after the service hardware interface has identified how many I/O controllers are attached to the I/O unit. The unit management service 28 assigns an I/O controller ID (IOC_ID) to each I/O controller 24, which confirms its readiness to move to the next step in the initialization sequence by returning its I/O controller ID. A unit management service 28 may then direct each I/O controller 24 to initialize which causes each I/O controller to perform various activities, for example, self test diagnostics. After completion of these activities, the I/O controller 24 notifies unit management service 28 that this has been completed, and the unit management service 28 may mark each I/O controller 24 as ready to perform I/O services, not ready to perform I/O services, or failed.

Unit discovery activities relate to initiators becoming aware of information related to a functioning I/O unit. During unit discovery an I/O unit may return information about the I/O unit as a whole as well as specific information about each of the I/O resources (I/O controllers) contained within the I/O unit. This information may be used by various I/O resource managers, that reside on the host units, to assign the resources to I/O drivers (initiators). A unit management service may use a target service interface to gather information about each attached I/O controller. This information is then returned to a requesting host unit. This information may be returned using a signaling connection path between an I/O resource manager on a host unit and a unit management service on the I/O unit.

Figure 11:
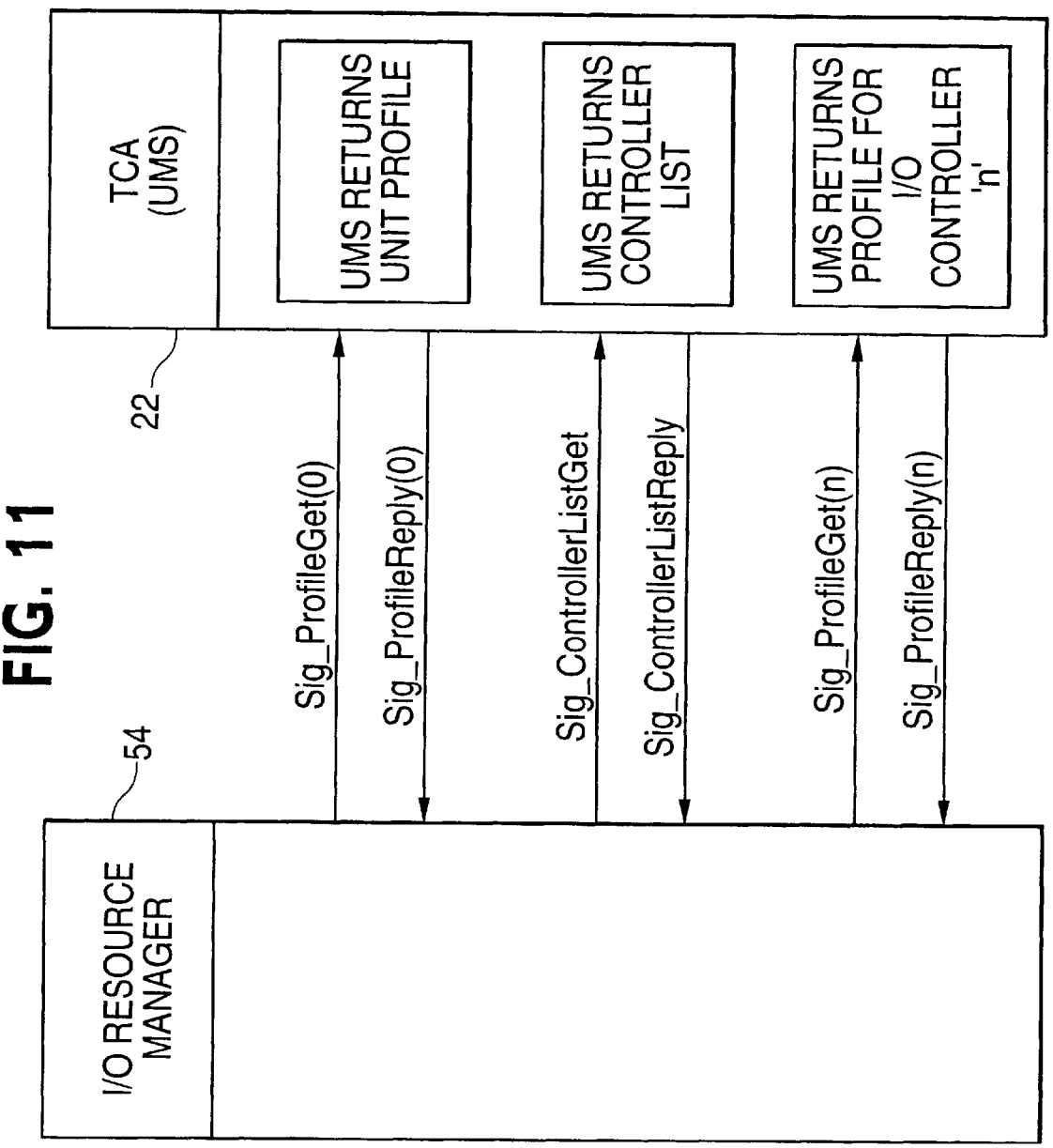
FIG. 11 shows a block diagram of example overview of the unit discovery process according to an example embodiment of the present invention.

FIG. 11 shows a block diagram of example unit discovery process according to the present invention. An I/O resource manager 54 may send a primitive to a target channel adapter (TCA) 22 of an I/O unit requesting the unit profile of the I/O unit. The target channel adapter 22 (i.e., unit management service portion thereof) may then return the unit profile for the I/O unit. An I/O resource manager 54 may then request a list of controllers attached to the I/O unit. The unit management service 28 once receiving this primitive may then supply a controller list which defines the IDs of all I/O controllers attached to the I/O unit. An I/O resource manager 54 may also request profile information for each I/O controller attached to an I/O unit. The unit management service upon receipt of this request may then return profile information for each I/O controller attached to the I/O unit to the I/O resource manager. Most of the information collected during I/O unit discovery may be provided by the unit management service 28 without querying the attached I/O controllers. However, if needed, a target channel adapter may request specific information from a specific I/O controller as a part of the unit discovery process. For example, if a target channel adapter supports dynamic allocation of channels to service connections to support higher bandwidth data traffic, the target channel adapter may choose to query the I/O controller for its bandwidth requirements before the unit management service generates and returns the unit profile. One piece of information that may be of value to a host unit, and which is returned by unit management service during discovery, may be the total number of I/O controllers which a target channel adapter is capable of supporting. Regarding unit profile information sent to an I/O resource manager of a host unit, this may include a variety of information about an I/O controller, for example, information related to: the protocol supported by an I/O controller, the maximum size of messages that an I/O controller may receive from the host, the maximum size of messages that an I/O controller may send to the host, the number of service connections an I/O controller may support, the number of service connections currently in use, the amount of bandwidth per service connection desired by an I/O controller, the maximum number of initiators supported by an I/O controller, the I/O controller ID, or other information important or necessary for host unit to know.

A connection configuration according to a target service interface according to the present invention may consist of a unit control connection between an I/O resource manager and an I/O unit's unit management service, and/or service connections between initiators and the I/O controllers. Generally, a unit control connection may be used to formulate service connections. Once service connections have been formulated and established, the unit control connection may be dropped. This allows other I/O resource managers connected through the switched fabric to access the I/O unit's unit management service.

An I/O resource manager 54 may use a signaling connection to request establishment of a unit control connection. A signaling connection between an I/O resource manager on a host unit and a unit management service on an I/O unit may use its own set of command primitives for communication. Examples of these are shown above the arrows between the I/O resource manager 54 and the unit management service of the TCA 22. The unit control connection may be used for configuring connections between an initiator and an I/O controller. The unit control connection may also serve as a convenient mechanism for resolving conflicts between various requesting initiators all of whom may be competing for the I/O unit's resources. Conflicts are easily resolved by allowing only one I/O resource manager at a time to request I/O unit resources. Once an I/O resource manager has completed its business with the unit management service, it destroys its unit control connection, thus freeing the connection for use by another I/O resource manager. Another way to control conflicts may be that an I/O resource manager may only be allowed to keep a unit control connection open for a specific period of time before the connection is automatically destroyed. Establishment of a unit control connection precedes establishing service connections and does not generate any activity on a target service interface.

Service connections may be created after receipt of an I/O resource manager's request for the creation of service connections between one of its initiators (e.g., I/O drivers) and an I/O controller. After receipt of this request, two separate activities may occur simultaneously during the creation of the service connection. First, channels may be created in the channel-based switch fabric that connect a target channel adapter to the host unit. Second, these channels are associated together into a service connection between an I/O controller and the message data service binding the I/O controller to it. At the time the service connection is created the behavior of the connection in the presence of errors and the configuration and use of the channels comprising the service connection may be defined. For example, a service connection may be defined as having the capability of transferring both message and data traffic, or may be defined as a connection that carries data only. Therefore, a channel configuration may be defined, for example, as one channel capable of supporting messages and data reads and writes, or may be defined as consisting of two or more channels, where one channel may be dedicated to transferring messages with the balance of the channels supporting data transfers. Further, a service connection may be defined as a data only service connection whereby any attempts to transfer message traffic may result in an error being generated and the service connection destroyed. A service connection may be destroyed by the I/O resource manager or the I/O unit itself. An I/O unit may decide to destroy the service connection if: 1.) the I/O controller decides to abandon use of the service connection, or 2.) the target channel adapter has detected errors on the service connection that render it unreliable.

Figure 12:
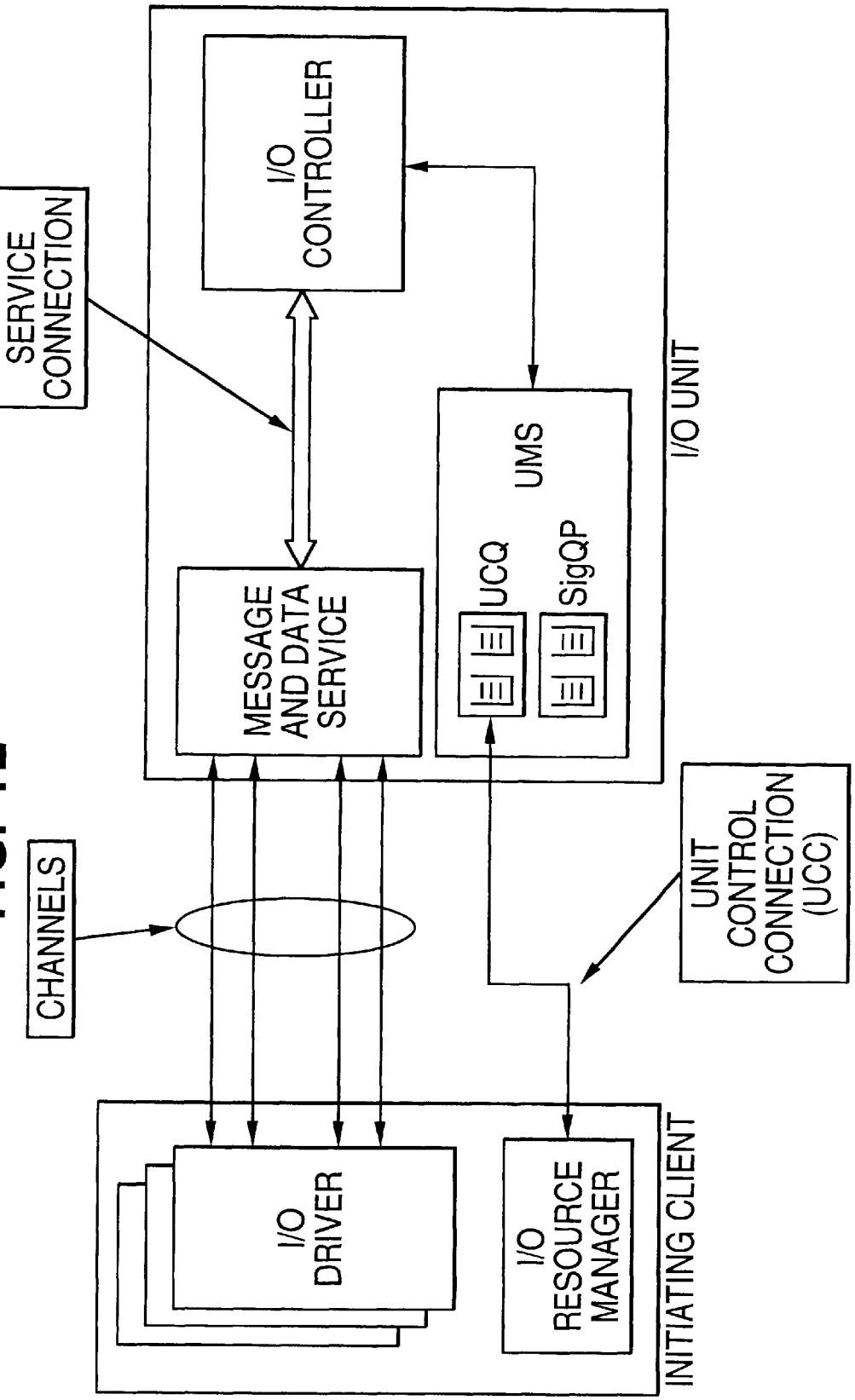
FIG. 12 shows an example data flow diagram of the unit control connection channels and service connection according to an example embodiment of the present invention.

FIG. 12 shows a data flow diagram of an example unit control connection, channels, and service connection. As noted previously, the unit control connection may be established first, where an I/O resource manager requests establishing service connections. Channels are then created in the channel-based switch fabric between a message and data service in an I/O unit and an initiator in the host unit. Concurrently, service connections may be created between the message and data service of this I/O unit and an I/O controller. Once service connections have been created, the unit control connection may be destroyed. The service connections may be destroyed as also noted previously, if errors are detected in the channels of the service connection or if it is desired by the host unit.

Example Syntax

The following describes an example syntax of command primitives that may be used in a target service interface between a TCA and its associated I/O resources (e.g., I/O controllers) according to the present invention. These target service interface (TSI) primitives may be used by a TCA to initialize and configure I/O resources, and by I/O resources to exchange messages and data with hosts connected to a channel-based switched fabric. The following only shows some example command primitives that may define a syntax of information exchanged between an I/O controller and a TCA. The delivery method and/or implementation may be by any method or structure and still be within the spirit and scope of the present invention. The following example primitives identify information exchanged across the interface, its purpose, and the effect of the primitive. The first group of message primitives describe example configuration operations and the second set describe example functional operations. Other primitives may be defined that facilitate communication between a TCA and its associated I/O resources and still be within the spirit and scope of the present invention.

Controller Initialization Primitives

TSI:IDENTIFY.indicate
Function: Used by the UMS to assign a name (handle) to each attached I/O controller.
Semantics: TSI:IDENTIFY.indicate(IOC_ID)
Parameters: IOC_ID is the name passed to the I/O Controller to be used to identify the controller in further TSI operations.
When Generated: this is a simple and concise way to both synchronize activities between the UMS and the I/O controllers at power on initialization time and to gather a list of each controller's GUID. May be used at several different times such as: (1) at power on/initialization time, (2) in response to a request from a host for a ControllerList (the controller list may contain a list of the GUIDs for each powered on I/O controller), and/or (3) whenever UMS becomes aware of a new I/O controller.
Effect of receipt: Assigns a handle (IOC_ID) to each attached I/O controller. Causes the I/O controller to reply with a confirmation message, and to return its GUID.

TSI:IDENTIFY.confirm
Function: Acknowledgment returned by the I/O controller to the UMS confirming IOC_ID.
Semantics: TSI:IDENTIFY.confirm(IOC_ID, GU/D)
Parameters: IOC_ID may be returned unchanged from the TSI:IDENTIFY.indicate primitive. It may be used to correlate this response to the TSI:IDENTIFY.indicate. GUID represents the I/O controller's Globally Unique Identifier.
When Generated: Generated by an I/O controller in response to a TSI:IDENTIFY.indicate primitive. If the I/O controller is powered on, it may respond to this primitive unless it is in a fatally failed condition.
Effect of receipt: Confirms that the I/O controller has received its IOC_ID. Upon receiving the TSI:IDENTIFY.confirm primitive, the UMS updates its table of attached I/O controllers.

TSI:INITIALIZE.indicate
Function: Generated by the UMS to initialize the I/O controller.
Semantics: TSI:INITIALIZE.indicate(IOC_ID) Parameters: IOC_ID specifies the controller that is the target of this primitive.
When Generated: When the I/O Unit powers on or is reset, and as necessary to reset the I/O controller(s). This primitive may also be generated by the UMS in an attempt to recover an I/O controller resource that has previously indicated TSI:CONTROLLER_FAILED.
Effect of receipt: The I/O controller resets its TSI interface. Following self-test diagnostics, the I/O controller generates the TSI:INITIALIZE.confirm primitive.

TSI:INITIALIZE.confirm
Function: Indication from the I/O controller to the UMS that the initialization process has been completed and the I/O controller is ready to proceed with the configuration process. Generated in response to TSI:INITIALIZE.indicate primitive.
Semantics: TSI:INITIALIZE.confirm(IOC_ID)
Parameters: IOC_ID identifies the controller which generated this primitive.
When Generated: Only following receipt of a TSI:INITIALIZE.indicate primitive.
Effect of receipt: The I/O controller notifies the UMS that its reset sequence is complete, and it is ready to exchange environmental information.

Controller Configuration Primitives

Each of the example primitives below may be targeted at a specific I/O controller. The controller being targeted is identified by its IOC_ID.

TSI:ENVIRONMENT.request

Function: Generated by the UMS to request information from the I/O controller on the specific operating environment that may be required by the controller and the MDS, such as the number of initiators supported, and the data bandwidth that may be required for each initiator.

Semantics: TSI:ENVIRONMENT.request(IOC_ID)

Parameters: IOC_ID parameter specifies the controller that is the target of this primitive.

When Generated: The UMS sends this request at connection establishment time, in order to determine the characteristics of the service connection being created.

Effect of receipt: The I/O controller returns information about its preferred operating environment.

TSI:ENVIRONMENT.response

Function: Generated by the target in response to a TSI:ENVIRONMENT.request primitive to con-figure the UMS with the I/O controller's operating requirements.

Semantics:TSI:ENVIRONMENT.response (IOC_ID, NumberOfInitiators, BwPerInitiator, ConnectionType, ResponseProtocol)

Parameters: IOC_ID identifies the controller which generated this primitive. NumberOf/Initiators is the number of independent initiators supportable by this I/O controller. BwPerInitiator variable provides an indication to the TCA of the I/O controller's bandwidth requirements for a given service connection. For TCAs which support multiple data channels per service connection, this variable may be used by the TCA to calculate the number of data channels to allocate for the service connection. ConnectionType indicates whether the I/O controller supports combined, compound, or data-only connections. A combined connection may be a service connection comprised of a single channel providing both message and data services. A compound connection may be comprised of two or more channels of which one may be dedicated to a message service with the balance being devoted to data service. ResponseProtocol indicates whether the I/O controller expects an Ordered Response Protocol (i.e., EXPLAIN) or Unordered Response Protocol (i.e., EXPLAIN).

When Generated: The I/O controller generates this primitive as a result of the TSI:ENVIRONMENT. request primitive.

Effect of receipt: The I/O controller supplies the UMS with the information needed to support the I/O controller.

TSI:CONTROLLER_STATUS.request

Function: Used by UMS to request the controller's current status. Possible responses are READY, NOT_READY, FAILED or FATAL_FAILED. The controller may be required to respond to this request within a specific time period, thus giving the UMS a positive indication of the controller's condition. If the controller is powered on, it is required to respond with at least a NOT_READY indication.

Semantics: TSI:CONTROLLER_STATUS.request (IOC_ID) Parameters: IOC_ID specifies the controller that is the target of this primitive.

When Generated: The UMS issues this command immediately prior to issuing a connection request in order to ascertain the condition of the controller. It may also issue this command at any time to validate that the controller is still in a ready condition.

Effect of receipt: Causes the I/O controller to respond with a TSI:CONTROLLER_STATUS.response message, possibly within a specific time period. This command may not modify the internal condition of the I/O controller in any way.

TSI:OP_STATUS.indicate

Function: Generated by the I/O controller either asynchronously to inform the UMS of a change in the controller's operational status, or in response to a TSI:CONTROLLER_STATUS.request primitive. Indicates the controller's current condition (READY, NOT_READY, FAILED, FATAL_FAILED).

Semantics: TSI:OP_STATUS.indicate (IOC_ID, TargetStatus) Parameters: IOC_ID identifies the controller which generated this primitive. Targe t St at us identifies the I/O controller's current state. READY indicates that the I/O controller is functioning normally and can accept and respond to any TSI primitives. NOT_READY means that the I/O controller, although present, can respond only to a TSI:CONTROLLER_STATUS primitive. The NOT_READY state is transient, meaning that it is expected that the controller will naturally progress to the READY state without further intervention. Any existing service connections to the I/O controller are closed. FAILED means that the I/O controller, although present can respond only to TSI:CONTROLLER_STATUS primitives.

When Generated: The I/O controller generates this primitive whenever its status changes, or in response to a TSI:CONTROLLER_STATUS.request.

Effect of receipt: If the UMS receives a NOT_READY status from the I/O controller during the process of establishing a service connection, may will return a status message (e.g., I/O controller not operational) to the initiating client requesting the connection. If the UMS receives an asynchronous OP_STATUS indicating FAILED or FATAL_FAILED, the UMS may terminate all service connections to the I/O controller and may attempt to close the underlying channels. For a FAILED status, the UMS may attempt to recover the I/O controller by issuing a TSI:INITIALIZE primitive.

TSI:POR_RESET.indicate

Function: Generated by the UMS to inform the I/O controllers that the TCA is undergoing a power on reset. The power on reset could be issued because the TCA's power system is powering up, or because a power down condition is imminent.

Semantics: TSI:POR_RESET.indicate(IOC ID) Parameters: IOC_ID parameter specifies the controller that is the target of this primitive.

When Generated: This reset may be generated when the UMS receives a power on indication from its associated power supply. Depending on the physical implementation of the TSI interface, the UMS may or may not be capable of generating this indication to all of its attached controllers. For example, if the physical interconnect is a shared bus structure that requires enumeration of the attached controllers, then the UMS may not be capable of signaling POR_RESET on initial power on. The UMS may use the POR_RESET indication to notify any attached I/O controllers if it receives a power on reset signal from its attached power supply indicating that power for the TCA is being withdrawn.

Effect of Receipt: The I/O controller is warned to close all service connections to the TCA. Depending on the controller's failover strategy, it may also choose to suspend, terminate or re-assign all I/O operations pending for I/O service requests received from that TCA.

TSI:QUERY.request

Function: Generated by the UMS to retrieve controller profile information

Semantics: TSI:QUERY.request (IOC_ID)

Parameters: IOC_ID parameter specifies the controller that is the target of this primitive.

When Generated: The UMS generates this primitive when it receives a Sig_ProfileGet(Controller-Profile) request from an I/O resource manager.

Effect of receipt: The addressed I/O controller generates a TSI:QUERY.response.

TSI:QUERY.response

Function: Generated by the target to supply its profile information

Semantics: TSI:QUERY.response (IOC_ID, BufferId)

Parameters: IOC_ID identifies the controller which generated this primitive. BufferId points to a buffer located in the I/O controller's memory space which contains the information needed by the TCA to build a SIG_ProfileReply message (signaling connection primitives).

When Generated: The I/O controller generates this primitive as a result of receiving the TSI:QUERY.request primitive.

Effect of receipt: The I/O controller passes a pointer to the UMS which identifies the location of a buffer containing the query information. The UMS then builds the appropriate SIG_ProfileReply message header and pulls the query information from the buffer supplied by the I/O controller. The TCA may not interpret or use any of this information. It may be intended solely to provide sufficient information to an I/O resource manager such that the I/O controller resource can be assigned to a given I/O driver. The buffer pointed to by BufferId may contain the following fields: VendorId (8 bytes), ProductId (8 bytes), ProductVersion (4 bytes), Ioclass (1 byte), IoSubClass (1 byte), Protocol (1 byte), ProtocolVersion (1 byte), RequestSize(2 bytes), ReplySize (2 bytes), Service-Connections (2 bytes), ScInUse (2 bytes), DataRate (2 bytes), InitiatorsSupported (2 bytes), Connec-tionAttributes (16 bytes), rsvd (4 bytes), Guid (16 bytes), IdString (80 bytes).

TSI:BIND.request

Function: Generated by the UMS to bind an I/O controller to a service connection.

Semantics: TSI:BIND.request (IOC_ID, SC_ID, ConnType, MdsMessageQueueDepth, MdsDataQueueDepth)

Parameters: IOC_ID parameter specifies the controller that is the target of this primitive. SC_ID specifies the service connection to which the request refers. The ConnType parameter identifies this as either a compound service connection (capable of sup-porting both message and data) or a data only service connection. The MdsMessageQueueDepth and MdsDataQueueDepth parameters are an indication to the I/O controller of the resources available on the TCA for moving messages and data. The MdsMessage-QueueDepth parameter specifies the total number of TSI:MSG_GET.request and TSI:MSG_SEND.request primitives the I/O controller may have outstanding at any given time. The MdsDataQueueDepth parameter specifies the total number of TSI:DATA_GET.request and TSI:DATA_PUT.request messages that the I/O controller may have outstanding at any given time.

When Generated: The UMS generates the TSI:BIND.request primitive after it has successfully allocated the appropriate number of work queue(s) for the requested service connection. Work queue allocation occurs as a result of receiving a UMS_ServiceCreate request from an initiating client.

Effect of receipt: The I/O controller prepares its end of the service connection and then generates the TSI:BIND-.response primitive.

TSI:BIND.response

Function: Generated by the I/O controller to inform the UMS that the I/O controller is ready to receive I/O requests on the control channel.

Semantics: TSI:BIND.response (IOC_ID, SC_ID, status)

Parameters: IOC_ID identifies the controller which generated this primitive. The SC_ID parameter identifies the service connection to which this request refers. The status parameter indicates whether the service connection was successfully bound or not.

When Generated: The I/O controller generates the TSI:BIND.request primitive after it posts at least one receive buffer.

Effect of receipt: The UMS finishes the service create sequence and signals the host that the service connection is operational.

TSI:UNBIND.request

Function: Generated by either the UMS or the I/O controller to initiate teardown of a service connection previously bound to the I/O controller.

Semantics: TSI:UNBIND.request (lOC_ID, SC_ID)

Parameters: IOC_ID parameter specifies the controller that is the target of this primitive. SC_ID identifies the Service Connection being unbound.

When Generated: The UMS generates the UNBIND.request primitive at the time it deallocates any work queue comprising a service connection. This might be as a result of receiving a Uma_Service_Destroy request from a host or as a result of a fatal error. The I/O controller may generate the TSI:UNBIND.request at any time when it believes that the service connection has become unusable, or whenever the service connection is no longer needed.

Effect of receipt: The I/O controller stops generating TSI primitives referring to that Service Connection. Further TSI primitives generated with the defunct Service Connection may be ignored by the MDS.

TSI:RESYNC.request

Function: Generated by the I/O controller after receipt of any functional response message containing non-zero status. This primitive applies only to service connections constructed using the Ordered Response Protocol. If this primitive is received on a service connection which is using the Unordered Response Protocol, it is considered a violation of TSI usage and will cause the TCA to initiate teardown of the service connection via the TSI:UNBIND.request primitive.

Semantics: TSI:RESYNC.request(SC_ID, Flag)

Parameters: SC_ID specifies the service connection to which this re-sync applies. Flag may be an 8 bit, bit significant field indicating to which service this resync request applies. The flag bits are as follows:

Flag(0): resynchronize the outbound message send service,
Flag(1): resynchronized the inbound message receive service,
Flag(2): resynchronize the data transfer service,
Flag(3:7): reserved, must be set to zero.

When Generated: This primitive is generated by the I/O controller after it has received a response to a functional request primitive (TSI:MSG_SEND.request, TSI:MSG_RCV.request, TSI:DATA_GET.request, TSI:DATA_PUT.request), which contains a non-zero status field. The non-zero status field indicates that the corresponding TSI request primitive had failed. The re-sync primitive is used by the I/O controller to instruct the TCA that it may resume accepting new request primitives. Until the TCA receives the re-sync primitive, it will respond to all TSI primitive requests received subsequent to the failed primitive with a failed status.

Effect of receipt: Receiving this primitive is the TCA's signal that it may begin accepting new request primitives from the I/O controller.

Functional Primitives

The following set of primitives may be used during the transfer of I/O service requests, I/O data and I/O ending status (completion reply) messages. TSI:MSG_SEND.request Function: Generated by the I/O controller to send a message on a control connection Semantics: TSI:MSG_SEND.request (Flag, SC_ID, MsgOpId, BufferId, Len)

Parameters: Flag is a bit significant field modifying the remaining fields of the primitive as follows: Flag(0): this bit indicates the presence of an immediate data field as a primitive parameter SC_ID identifies the service connection. The MsgOpId field is a handle supplied by the I/O controller that it uses to correlate this message service request with a given message service response and to correlate the entire sequence with a particular I/O transaction. The BufferId parameter is a pointer to a message buffer. The BufferId parameter is a logical handle for a buffer field, which is translated by the SHIF layer into a physical address representing a location in the I/O controller's memory space. For a simple implementation, the BufferId field may degenerate into a physical address field. The len parameter specifies the size of the buffer.

When Generated: Anytime the I/O controller wishes to send a message

Effect of receipt: The TCA queues the message for transmission on the appropriate channel.

TSI:MSG_SEND.response

Function: Generated by the TCA to acknowledge completion of a TSI:MSG_SEND.request Semantics: TSI:MSG_SEND.response (SC_ID, MsgOpId, BufferId, MessageLen, SendStatus)

Parameters: SC_ID identifies the service connection. The MsgOpId field is a handle supplied by the I/O controller that it uses to correlate this message service request with a given message service response and to correlate the entire sequence with a particular I/O transaction. The BufferId parameter is a handle pointing to the buffer for which control is being returned to the I/O controller. The MessageLen parameter specifies the amount of data transmitted successfully. The SendStatus specifies the result of the send operation. The status codes are as follows:

When Generated: When the MDS retires the SEND request from the appropriate channel's send queue.

Effect of receipt: Control of the message buffer is returned to the I/O controller for re-use.

TSI:MSG_RCV.request

Function: Generated by the I/O controller to specify the location in the I/O controller's memory space to which the TCA should deliver an inbound message.

Semantics: TSI:MSG_RCV.request (SC_ID, MsgOpId, BufferId, BufferLen)

Parameters: SC_ID identifies the service connection to which this request refers. The MsgOpId field is a name supplied by the I/O controller that it uses to correlate this message ser-vice request with a given message service response and to correlate the entire sequence with a particular I/O transaction. The BufferId parameter is a handle to a buffer for which control is being passed to the MDS.

When Generated: The I/O controller arbitrarily posts message frames in preparation to receiving inbound I/O service requests from an initiating client.

Effect of receipt: The TCA queues a receive descriptor to the receive work queue of the specified service connection.

TSI:MSG_RCV.indicate

Function: Generated by the TCA to indicate that an inbound message has been received.

Semantics: TSI:MSG_RCV.indicate (SCID, MsgOpId, RcvStatus, BufferId, MessageLen)

Parameters: SC_ID identifies the service connection to which this request refers. The MsgOpId field is a handle supplied by the I/O controller that it uses to correlate this message service request with a given message service response and to correlate the entire sequence with a particular I/O transaction. The RcvStatus specifies the result of the receive operation and if the message data is valid. The BufferID parameter points to the buffer containing the inbound message. The messageLen parameter specifies the size of the received message.

When Generated: The TCA generates this primitive when a message buffer posted to the receive queue of a service connection is removed from the receive queue in response to receipt of an inbound message.

Effect of receipt: The message buffer is returned to the I/O controller, allowing the I/O controller to schedule the processing of the received message.

TSI:DATA_GET.request

Function: Generated by the I/O controller to perform a read from a host's memory using the specified data service.

Semantics: TSI:DATA_GET.request (SC_ID, DataOpId, DataLength, BufferID, RemotetAddress)

Parameters: SC_ID specifies the service connection to which this request applies. The DataOpId parameter is an arbitrary value supplied by the I/O controller for use by the TCA, which returns it along with the response to the request in order to correlate the acknowledgment to the original request. The DataLength parameter specifies the length of data to move. The BufferID parameter specifies the where the data is to be placed in the I/O Unit. The RemotetAddress parameter specifies where the data is located in the host and includes the memory handle.

When Generated: The I/O controller generates this primitive whenever it needs to read host memory.

Effect of receipt: The TCA queues RDMA Read operation (s) to one or more work queue(s).

TSI:DATA_PUT.request

Function: Generated by the I/O controller to perform a write to a host's memory using the specified data service.

Semantics: TSI:DATA_PUT.request (SC_ID, DataOpId, DataLength, BufferID, RemoteAddress)

Parameters: The SC_ID parameter specifies the service connection to which this request applies. The DataOpId parameter is an arbitrary value supplied by the I/O controller for use by the TCA, which returns it along with the response to the request in order to correlate the acknowledgement to the original request. The DataLength parameter specifies the length of data to move. The BufferID parameter specifies where the data resides in the I/O unit. The RemoteAddress parameter specifies where the data is to be placed in the remote address space (host memory) and includes the memory handle. The RemoteAddress parameter may be in the form of a Virtual Address/Memory Handle pair, and must have been supplied previously by the remote host.

When Generated: The I/O controller generates this primitive whenever it needs to write data to host memory.

Effect of receipt: The TCA queues RDMA Write operation (s) to one or more work queue(s).

TSI:DATA_GET.response

Function: Generated by the TCA to inform the I/O controller that a data operation has completed.

Semantics: TSI:DATA_GET.response (SC_ID, DataOpId, DataMoveStatus)

Parameters: SC_ID specifies the service connection to which this response applies. DataOpId is the name supplied by the I/O controller at the time of the request. This parameter is furnished to the I/O controller as a service to simplify the mechanism for correlating this response to a given data transfer request and to a specific I/O operation such as a particular SCSI read operation. The DataMoveStatus parameter specifies the result of the data movement operation.

When Generated: The TCA generates this primitive whenever it completes a TSI:DATA_GET operation.

Effect of receipt: Control of the buffer specified in the original operation is returned to the I/O con-troller.

TSI:DATA_PUT.response

Function: Generated by the TCA to inform the I/O controller that a data operation has completed.

Semantics: TSI:DATA_PUT.response (SC_ID, DataOpld, DataMoveStatus)

Parameters: SC_ID specifies the service connection to which this response applies. The DataOpId parameter is the value supplied by the I/O controller at the time of the request. This parameter is furnished to the I/O controller as a service to simplify the mechanism for correlating this response to a given data transfer request and to a specific I/O operation such as a particular SCSI read operation. The DataMoveStatus parameter specifies the result of the data movement operation.

When Generated: The TCA generates this primitive whenever it completes a TSI:DATA_PUT operation.

Effect of receipt: Control of the buffer specified in the original operation is returned to the I/O con-troller.

TSI:DATA_GET_LIST.request

Function: Generated by the I/O controller to perform a read from a host's memory using the specified data service. This primitive differs from the normal TSI:DATA_GET.request in that this primitive is used to pass a buffer containing a scatter list. Each element in the scatter list is a separate DMA object defining a block of data to be fetched from remote memory and a buffer handle in local memory to which the block should be written. This primitive allows the I/O controller to request transfer of a number of blocks of data each of which may be written to physically discontiguous buffers in the I/O controller's memory space.

Semantics: TSI:DATA_GET_LIST.request (SC_ID, DataOpId, ListLength, ListID)

Parameters: SC_ID specifies the service connection to which this request applies. The DataOpId parameter is an arbitrary value supplied by the I/O controller for use by the TCA, which returns it along with the response to the request in order to correlate the acknowledgement to the original request. The ListLength parameter specifies the length of the scatter list. Each entry in the scatter list represents a data element (block) to be moved from remote memory to the I/O controller's memory space. The ListID parameter specifies the handle of the buffer containing the list of elements to be transferred. The TCA uses the ListLength and ListID parameters to fetch the scatter list from the I/O con-troller's memory space. The scatter list must be in physically contiguous memory in the I/O controller's memory space if the TCA's SHIF layer does not perform virtual to physical address mapping. If the TCA's SHIF layer is capable of performing virtual to physical address mapping, then the only requirement is that the scatter list be in virtually contiguous memory.

When Generated: The I/O controller generates this primitive whenever it needs to read host memory. This command allows the I/O controller to fetch multiple blocks of data from host memory. The sole restriction is that the blocks of data in host memory must be virtually contiguous.

Effect of receipt: The TCA queues RDMA Read operation(s) to one or more work queue(s).

TSI:DATA_PUT_LIST.request

Function: Generated by the I/O controller to perform a write to a host's memory using the specified data service. This primitive allows the I/O controller to direct the TCA to gather blocks of data from discontiguous locations in the I/O controller's memory space for delivery to a remote location. The only restrictions to this primitive are that the list, which describes the DMA objects to be transported must be in physically contiguous memory unless the TCA's SHIF layer supports physical to virtual memory mapping. In that case, the gather list must be in virtually contiguous memory in the I/O con-troller's memory space. For each data block being transferred, the destination must be to virtually contiguous locations in the remote node's memory space.

Semantics: TSI:DATA_PUT_LIST.request (SCID, DataOpId, ListLength, ListID)

Parameters: SC_ID specifies the service connection to which this request applies. The DataOpId parameter is an arbitrary value supplied by the I/O controller, which is returned by the TCA along with the response primitive in order to allow the I/O controller to correlate the acknowledgement to the original request and to the underlying I/O transaction. The DataLength parameter specifies the length of data to move. The ListID parameter is a handle identifying the buffer which contains the gather list. The RemoteAddress parameter specifies where the data is to be placed in the remote address space (host memory) and includes the memory handle. The RemoteAddress parameter may be in the form of a Virtual Address/Memory Handle pair, and must have been supplied previously by the remote host.

When Generated: The I/O controller generates this primitive whenever it needs to write data to host memory.

Effect of receipt: The TCA queues RDMA Write operation(s) to one or more work queue(s).

TSI:DATA_GET_LIST.response

Function: Generated by the TCA to inform the I/O controller that a data operation has completed.

Semantics: TSI:DATA_GET_LIST.response (SC_ID, DataOpld, DataMoveStatus)

Parameters: SC_ID specifies the service connection to which this response applies. The DataOpld parameter is the value supplied by the I/O controller at the time of the request. This parameter is furnished to the I/O controller as a service to simplify the mechanism for correlating this response to a given data transfer request and to a specific I/O operation such as a particular SCSI read operation. The DataMoveStatus parameter specifies the result of the data movement operation.

When Generated: The TCA generates this primitive whenever it completes a TSI:DATA_GET_LIST operation.

Effect of receipt: Control of the buffer specified in the original operation is returned to the I/O con-troller.

TSI:DATA_PUT_LIST.response

Function: Generated by the TCA to inform the I/O controller that a data operation has completed.

Semantics: TSI:DATA_PUT_LIST.response (SC_ID, DataOpId, DataMoveStatus)

Parameters: SC_ID specifies the service connection to which this response applies. The Dataopld parameter is the value supplied by the I/O controller at the time of the request. This parameter is furnished to the I/O controller as a service to simplify the mechanism for correlating this response to a given data transfer request and to a specific I/O operation such as a particular SCSI read operation. The DataMoveStatus parameter specifies the result of the data movement operation.

When Generated: The TCA generates this primitive whenever it completes a TSI:DATA_PUT_LIST operation.

Effect of receipt: Control of the buffer specified in the original operation is returned to the I/O con-troller.

Diagnostic Primitives (TBD)

This set of TSI primitives is used to invoke both diagnostics internal to the I/O controller and to control the execution of diagnostics involving interactions between the I/O controller and the MDS (e.g. loop back tests).

Maintenance Primitives (TBD)

This set of TSI primitives is used to both download firmware to an I/O controller, change configurable settings on an I/O controller, and change configurable settings on the TCA.

Error Behavior

A target service interface according to the present invention may include interactions between a TCA and its associated I/O controllers in the course of responding to and managing errors that may be detected related to the channel-based switch fabric. Since the TCA target channel adapter responds to requests from the I/O controller to move either a message or data, the target channel adapter bears some responsibility for attempting to recover from errors that may arise in the course of transferring a message and/or data. If the target channel adapters recovery attempt is unsuccessful, it may report to the I/O controller that the given message or data transfer did not succeed. Therefore, the TCA may retry a message transfer operation if a retry is allowed, or may simply report the error to the I/O controller that the message could not be transferred successfully. Errors that may be related to a specific channel (e.g., sequence errors and channels errors) may be termed isolating errors since they may be isolated to a particular service connection. A TCA that detects an isolating error may be responsible for performing recovery activities to attempt to recover from the error. The error and the recovery activities may be transparent to the I/O controller. If a target channel adapter has exhausted its recovery procedures and is unable to correct or recover from an error, the error may be considered a non-recoverable error and, therefore, the I/O controller may be notified accordingly by the target channel adapter. At this point, the I/O controller may initiate recovery operations of its own or take appropriate action based on the detected error and the unsuccessful transfer of the message or data.

In a target service interface according to the present invention it is desirable that whenever possible, as much communication be preserved between an I/O controller and a host, even in the presence of errors. This allows for greater opportunities for error recovery operations. For example, if an unrecoverable error occurs while a target channel adapter is attempting to send a message from an I/O controller to the host, it is desirable to maintain a viable inbound message path for messages from the host to the I/O controller. This inbound path may be used by the host, for example, to issue a reset command in an attempt to recover the use of the I/O controller.

A target channel adapter may implement the transfer of messages and data using either of two different protocols. A target channel adapter may implement the transfers via an ordered response protocol or an unordered response protocol. These protocols apply to a specific service connection independently and may be established at the time the service connection is created. An ordered response protocol may be used in applications where there may be some degree of interdependence between the operations posted to a given service connection, which implies a need for ordering between the operations.

For example, if it is necessary for a read operation to complete prior to the execution of the following write operation, there is an implied ordering relationship between the read and write operations. On the other hand, for some applications the order of operations posted to a given service connection may be unimportant. For example, since the TCP/IP protocol stack does not rely on a channel-based switched fabric's reliable delivery characteristics to guarantee delivery of network packets, the loss of one or more packets may not be considered a failure. Therefore, in these cases, an unordered response protocol may be used for these applications.

The protocol implemented may determine how specific errors that are detected may be handled. In an ordered response protocol, since this protocol effects only operations posted to a given target service interface for a specific service connection, an error detected during an outbound message send operation may not effect either the inbound message receive service or the data transfer service. If a target channel adapter is implementing an order response protocol, an unrecoverable error that is detected will cause the target channel adapter to pause the operation on which the error occurred. All other operations for the same service which were posted subsequent to it may also be paused. The target channel adapter may then purge all subsequent operations and return a target service interface response primitive to the I/O controller notifying the I/O controller of the failed operation.

Figure 13:
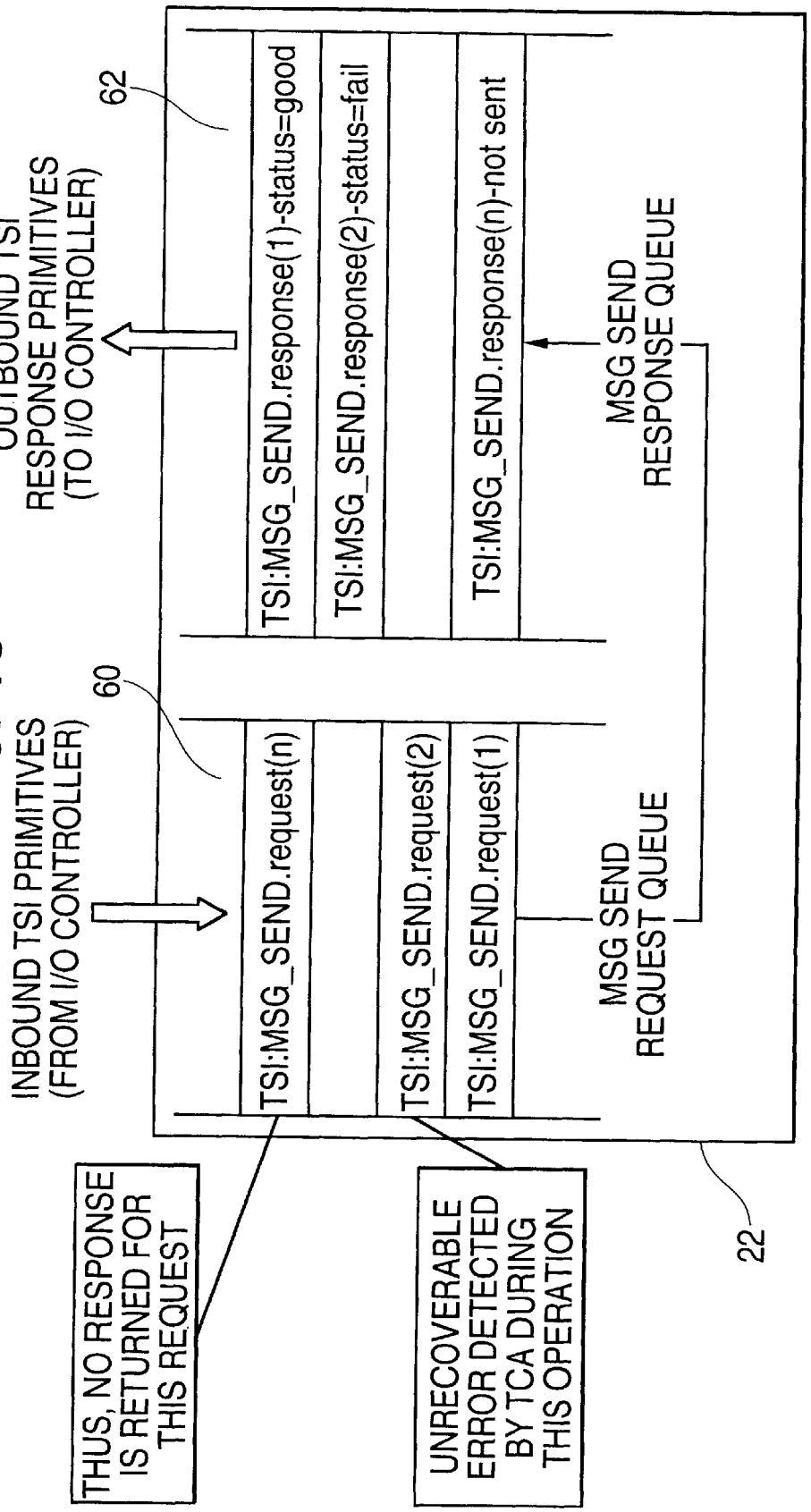
FIG. 13 shows an example message send request queue and an example message send respond queue of an example target channel adapter according to an example embodiment of the present invention.

FIG. 13 shows an example message send request queue and message send response queue of a target channel adapter according to the present invention. The message send request queue 60 receives inbound target service interface primitives from an I/O controller. These primitives define messages which are queued inside the message send request queue 60. Note that in this diagram the target channel adapter 22 has detected an unrecoverable error during the operation of send request number two. Therefore, in the response queue 62 the target channel adapter 22 may send a response status of good for all successful transfers that occurred before detection of the unrecoverable error, and send a response status of fail for the message on which the error was detected (i.e., message (2)). All subsequent message transfers to the message where an unrecoverable error was detected may be purged from the send message response queue 62, and therefore, not sent to the I/O controller.

Under ordered response protocol, after the target channel adapter has received a failure status for an operation, it will accept no further inbound target service interface primitives from the I/O controller until it has received a resync.indicate primitive for the service on which the error occurred. This primitive may signal to the target channel adapter that the I/O controller has recognized the failed operation and understands that any operation subsequent to it have been lost. After sending the resync primitive, the I/O controller may not be required to await an acknowledgment from the target channel adapter. The I/O controller may immediately begin posting target service interface primitives to the target channel adapter. An I/O controller may choose one of four actions after sending the resink primitive: it may choose to resume operations with the failed operation simply by reposting the failed target service interface primitive; it may choose to skip the failed operation and resume operations at a different point at the protocol flow; it may choose to send a message to the initiator indicating the loss of one or more messages, where this option gives a host the opportunity to attempt to reset an I/O controller and restart the associated service connections; or it may issue an unbind primitive, effectively requesting that the target channel adapter discontinue the effected service connection. The choice of the recovery action may be governed solely by the higher level protocol being implemented by an I/O controller. This gives an I/O controller wide latitude in implementing an error recovery procedure. If the I/O controller chooses to drop the service connection, the target channel adapter may purge all operations associated with that particular service connection, return all associated resources to their respective free pools, and clear any context associated with the service connection and return to an idle condition. Any further inbound packets for any of the channels formerly associated with that service connection will be dropped.

When executing an unordered response protocol, the target channel adapter may always return a target service interface response primitive for every inbound target service interface request primitive received. However, only the effected operation may be allowed to fail. All other operations on the same service connection are allowed to continue to execute normally. The target channel adapter may simply return a target service interface response primitive indicating which operation failed, while obeying the normal rules about returning responses in the correct order.

Two types of errors that may occur on a target service interface are: the hardware interface may indicate a transmission error, such as a parity error, in moving a target service interface primitive between a target channel adapter and an I/O controller; or a target channel adapter may receive an unexpected or unrecognized target service interface primitive. For both of these cases the particular service connection may be considered no longer valid. It may be the responsibility of the client at the end of the interface which detects the error to generate an unbind request primitive in order to destroy the service connection. Any further target service interface primitive received by the station detecting the error may be discarded.

Errors detected by a target channel adapter may be classified as a non-isolating error or an isolating error. Non-isolating errors are errors that render the entire transferred data unusable such that it is not possible to correlate the inbound transferred data to any given channel. In these cases, the target channel adapter may simply drop the transferred data. No other action may required by the target channel adapter. Further, no specific recovery action may be required. However, note that dropped transferred data may generally cause follow-on errors, which may be isolating errors.

Isolating errors are errors that may be detected by a target channel adapter and that may be isolated to a given channel. Isolating errors may include: sequence errors, bounds errors, execution errors, and remote access errors. There may be a number of circumstances that may prevent a target channel adapter from successfully delivering a request packet to a host. These circumstances may range from a local error preventing the target channel adapter from fetching the request packet from the I/O controllers memory, to errors detected in the process of transmitting the request packet, to errors detected in the response to the request packet.

Table 1 shows example errors that may prevent a target channel adapter from delivering an outbound request packet, and prescribes the target channel adapters recommended response to each. After the target channel adapter has completed the procedure described in the second column of Table 1, if the target channel adapter is still unable to successfully deliver the outbound request message, the target channel adapter may consider the error unrecoverable and notify the I/O controller accordingly. A status message that a target channel adapter may return to an I/O controller is shown in column 3 of Table 1. An execution error may be catastrophic, meaning that the remote node to which a target channel adapter was attempting to transmit the request will not continue operating, or may be an operator error.

TABLE 1

| ERROR NAME | TARGET CHANNEL ADAPTER RECOVERY METHOD | RESPONSE TO UNRECOVERABLE ERROR |
| --- | --- | --- |
| Outbound Local Access Error | Perform defined number of retries, then mark as unrecoverable | Return response to I/O controller: status = failed, local access error. |
| Inbound Response Error | Handle the same as channel timeout. Perform defined number of retries, then mark as unrecoverable | Return response to I/O controller: status = failed, error on inbound response packet. |
| Sequence Error | Perform defined number of retries, then mark the error as unrecoverable | Return response to I/O controller: status = failed, outbound seq error |
| Bounds Error | Optional retry, then mark the error as unrecoverable | Return response to I/O controller: status = failed, outbound bounds error |
| Remote Access Error | Optional retry, then mark the error as unrecoverable | Return response to I/O controller: status = failed, remote access error |
| Non-catastrophic Execution Error | Perform defined number of retries, then mark the error as unrecoverable. | Return response to I/O controller: status = failed, non-catastrophic execution error |
| Catastrophic Execution Error | Immediately mark the corresponding TCA service as unavailable. Ignore any further inbound TSI primitives for that service on that service connection. | Return response to I/O controller: status = failed, catastrophic execution error |

Outbound local access errors may be errors detected by a service hardware interface in the process of attempting to fetch an outbound request packet from an I/O controller's local memory space. This may be due to a parity error detected by the service hardware interface, a time out on the local access bus, an addressing error, or an invalid access for cases where the service hardware interface implements an address translation mechanism. To guard against incomplete request packets, a target channel adapter may be required to not begin transmitting any part of the outbound request packet until the entire request packet has been fetched from the I/O controllers local memory space. Thus, the target channel adapter may be required to provide buffering for at least one complete outbound request packet. To recover from these errors, a target channel adapter may retry the local bus access for a number of times. If a service hardware interface fails to deliver an outbound request packet after a specific number of retries, the target channel adapter may consider the error unrecoverable.

An inbound response packet error suggests that the target channel adapter was able to isolate the inbound packet to a given channel and to determine that it is a response packet, but some other error in the structure of the response packet invalidates the response. An example of this may be an inbound response packet with an incorrect transfer data payload length. For the sake of simplicity these packets may be simply dropped by a target channel adapter, and handled in the same manner as a channel timeout.

A sequence error is an error that suggests that a target channel adapter received a negative acknowledgment from the remote end indicating that a packet had been received out of order. This may generally occur because a transferred data packet from a previous transferred data packet had been dropped, or because the packet sequence number counters on both ends of the transaction had become unsynchronized. Sequence errors generally may occur with a low frequency and thus may be considered recoverable by a target channel adapter. A packet sequence number may be contained in an inbound negative acknowledge packet that the remote end had expected to receive. Given that a target channel adapter may maintain a queue of outbound requests for a particular channel, the target channel adapter may back up of the list of outstanding operations posted to this channel and resend them, beginning with the operation bearing the remote ends expected packet sequence number. Although many of these errors may be recoverable it may be possible that many are not, therefore to prevent endless retrying of such operations a target channel adapter may be required to limit itself to a specific number of retry attempts. Following these retry attempts, a target channel adapter may mark the error as unrecoverable and return a response to the I/O controller indicating failure.

Bounds error on outbound request operations occur when a target channel adapter received a negative acknowledgment from the remote end indicating that the response was outside the specific limits of the channels behavior. For example, if a remote end specified that it could accept no more than three outstanding read requests at any one time, then it may signal a bounds error if the target channel adapter posted a request for a read request in addition to the number allowed (e.g., three). A bounds error may be considered by a channel-based switched fabric to be one of a number of channel errors that may be isolated to a channel, but is not a sequence error. Bounds errors, in general, indicate a serious misuse of a channel-based switch fabric, and may occur, for example, because the target channel adapter may have mishandled an inbound target service interface primitive, or because the target channel adapter may have lost track of the number of outstanding read requests, or because the I/O controller requested immediate data transfer on a service which does not support it. A target channel adapter may or may not retry these errors since there may be a low likelihood of successful recovery of these operations through retry. Once a target channel adapter is marked in operation as unrecoverable, it notifies the I/O controller by returning the proper status and the target service interface response primitive.

Remote access error indicates that a remote node may have been unable to write the packet payload into its memory. This may occur because the memory token passed to the remote node by the target channel adapter was invalid, or because of a page fault in host memory. If the memory token is invalid, it may be because the memory token, as passed to an I/O controller by a host I/O driver, was invalid, or because it was corrupted due to an error in the I/O controller. In either case, given the low likelihood of success if the operation is retried, remote access errors may be considered unrecoverable by a target channel adapter immediately. The target channel adapter may simply inform the I/O controller of the operation failure and wait for the I/O controller to recover. The higher level protocol may either return ending status to the host indicating that an I/O operation failed, or it may choose to retry the data transfer operation.

An execution error indicates that a remote end encountered an error while attempting to process a request packet. Execution errors may be further subdivided into catastrophic errors or operational errors. Both may be considered execution errors in that the remote site is unable to fulfil their request. A catastrophic execution error effects all subsequent requests posted to the same channel. Therefore, the channel has become unusable and may not be recovered through retry mechanisms. Catastrophic execution errors may be ones that prevent the host from continuing operation on the effected channel. Therefore, the corresponding target channel adapter becomes unavailable. If an I/O controller believes that the corresponding service, such as an inbound message send service, is crucial to continue execution of a higher level protocol, then the I/O controller may elect to request that the service connection be destroyed. If, on the other hand, an I/O controller believes that it may continue operations, but at a degraded level, then it may due so. However, it may have to discontinue use of the service on which the error was detected. The I/O controller may continue to use the other services provided on the service connection. For example, if a catastrophic execution error occurred while the target channel adapter was attempting to perform a write operation, the target channel adapter may ignore any further primitives posted to the data transfer service. However, the outbound message send service and inbound message receive service may continue to operate normally. Non-catastrophic execution errors may be handled very much like a sequence error in that the same operation that caused the error should be retried by the target channel adapter a specific number of times.

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed:

1. A method for interfacing at least one Input/Output (I/O) controller to a channel-based switched fabric comprising:
    providing at least one channel adapter, the at least one channel adapter allowing connection of the at least one I/O controller to a channel-based switched fabric, the at least one channel adapter supporting transferring of at least one of messages and data between the at least one I/O controller and at least one initiating unit connected to the channel-based switched fabric;
    providing a physical interface between the at least one I/O controller and the at least one channel adapter; and
    defining a set of command primitives, the command primitives communicating information between the at least one I/O controller and the at least one channel adapter via the physical interface.

2. The method according to claim 1, wherein the transferring of messages from one of the at least one initiating unit to one of the at least one I/O controller includes:
    allocating at least one buffer to receive inbound messages, the allocation performed by the one of the at least one I/O controller;
    passing control of the at least one buffer from the one of the at least one I/O controller to the channel adapter;
    receiving an inbound message, the inbound message being received by the channel adapter from the one of the at least one initiating unit;

storing the inbound message in one of the at least one buffer; and passing control of the one of the at least one buffer from the channel adapter to the one of the at least one I/O controller.

3. The method according to claim 1, wherein the transferring of messages from one of the at least one I/O controller to one of the at least one initiating unit includes:

constructing a message in at least one buffer, the constructing being performed by the one of the at least one I/O controller;

passing control of the at least one buffer from the one of the at least one I/O controller to the channel adapter;

transferring the message to the one of the at least one initiating unit by the channel adapter; and passing control of the at least one buffer from the channel adapter to the one of the at least one I/O controller.

4. The method according to claim 1, wherein the transferring of data includes:

passing control of at least one block of memory in one of the at least one initiating unit to one of the at least one I/O controller;

transferring the data between the one of the at least one initiating unit and the one of the at least one I/O controller, the data being transferred one of from the at least one block of memory and to the at least one block of memory; and passing control of the at least one block of memory from the one of the at least one I/O controller to the one of the at least one initiating unit.

5. The method according to claim 1, wherein the transferring of data includes:

passing control of at least one block of memory in one of the at least one I/O controller to one of the at least one initiating unit;

transferring the data between the one of the at least one initiating unit and the one of the at least one I/O controller, the data being transferred one of from the at least one block of memory and to the at least one block of memory; and passing control of the at least one block of memory from the one of the at least one initiating unit to the one of the at least one I/O controller.

6. The method according to claim 1, wherein the transferring of data includes:

loading the data in at least one buffer in one of the at least one initiating unit;

sending the data from the buffer to one of the at least one I/O controller; and receiving the sent data at the one of the at least one I/O controller.

7. The method according to claim 1, wherein the transferring of data includes:

loading the data in at least one buffer in one of the at least one I/O controller;

sending the data from the buffer to one of the at least one initiating unit; and receiving the sent data at the one of the at least one initiating unit.

8. The method according to claim 1, the channel adapter being a part of an I/O unit.

9. The method according to claim 8, further comprising providing a unit management service (UMS), the UMS being a part of the channel adapter, the UMS managing at least one of initialization operations, discovery operations, and connection configuration operations related to at least one of the at least one I/O controller, the channel adapter, and the I/O unit.

10. The method according to claim 8, further comprising providing a message and data service (MDS), the MDS being a part of the channel adapter, the MDS performing the transferring of at least one of messages and data between the at least one I/O controller and the at least one initiating unit.

11. The method according to claim 1, the at least one I/O controller being a part of an I/O unit.

12. The method according to claim 1, wherein the physical interface is adaptable to the at least one I/O controller.

13. The method according claim 1, wherein the command primitives is adaptable to the at least one I/O controller and the transferring of at least one of messages and data.

14. The method according to claim 1, at least one of the at least one I/O controller, the physical interface, and the at least one channel adapter detecting errors that occur during the communicating of information between the at least one I/O controller and the at least one channel adapter.

15. The method according to claim 1, the at least one channel adapter detecting errors that occur during the transferring of at least one of messages and data between the at least one I/O controller and the at least one initiating unit, the at least one channel adapter reporting errors detected to the at least one I/O controller.

16. A method for interfacing at least one Input/Output (I/O) controller to an adapter, the at least one I/O controller being part of an I/O unit, the adapter providing an interface for the I/O unit to a channel-based switched fabric, comprising:

executing initialization operations related to the at least one I/O controller and the adapter;

executing discovery operations related to the at least one I/O controller and the adapter;

establishing a connection configuration between at least one initiating unit and the I/O unit;

sending an I/O service request from the at least one initiating unit to the I/O unit;

transferring at least one of messages and data between the at least one initiating unit and the at least one I/O controller; and sending an I/O completion message from the at least one I/O unit to the at least one initiating unit after completion of the transferring, wherein the first sending, transferring, and second sending occur across a channel-based switched fabric.

17. The method according to claim 16, wherein the I/O service request comprises:

an I/O controller identification for one of the at least one I/O controller;

an initiating unit identification for one of the at least one initiating unit; and at least one pointer to at least one buffer in the one of the at least one initiating unit, the at least one pointer being used by the one of the at least one I/O controller to identify where to one of transfer data to and transfer data from the at least one buffer.

18. A method for interfacing at least one Input/Output (I/O) controller to an adapter, the at least one I/O controller and the adapter being part of an I/O unit, the adapter providing an interface for the at least one I/O controller to a channel-based switched fabric, comprising:

providing a physical interface between the at least one I/O controller and the adapter, the physical interface being adaptable to the at least one I/O controller;

defining a set of command primitives, the command primitives communicating commands between the at least one I/O controller and the adapter, the command primitives being transferred between the at least one I/O controller and the adapter via the physical interface;

providing a unit management service (UMS), the UMS being a part of the adapter, the UMS managing at least one of initialization operations, discovery operations, and connection configuration operations related to at least one of the at least one I/O controller, the adapter, and the I/O unit; and providing a message and data service (MDS), the MDS being a part of the adapter, the MDS supporting transferring of at least one of messages and data between the at least one I/O controller and at least one initiating unit connected to a channel-based switched fabric.

19. The method according to claim 18, the initialization operations comprising at least one of:
   initializing the physical interface between each at least one I/O controller and the adapter;
   naming each at least one I/O controller; and
   initializing each at least one I/O controller.

20. The method according to claim 18, the discovery operations comprising at least one of:
   retrieving a unit profile for the I/O unit, the unit profile information being retrieved by the adapter and sent to at least one I/O resource manager, each at least one I/O resource manager being part of the at least one initiating unit;
   retrieving a controller list for the I/O unit, the controller list being retrieved by the adapter and sent to the at least one I/O resource manager; and
   retrieving an I/O controller profile for each at least one I/O controller, each I/O controller profile being retrieved by the adapter and sent to the at least one I/O resource manager.

21. The method according to claim 18, the connection configuration established by at least one of:
   establishing a unit control connection between the I/O unit and an I/O resource manager, the I/O resource manager being part of the at least one initiating unit; and
   creating service connections between at least one driver of the at least one initiating unit and the at least one I/O controller.

22. The method according to claim 21, wherein the unit control connection is destroyed upon completion of the creating service connections.

23. The method according to claim 21, the service connections comprising channels in the channel-based switched fabric, the channels handling the transferring of at least one of messages and data between the at least one initiating unit and the at least one I/O controller.

24. The method according to claim 23, the service connections being used for the transferring of messages only.

25. The method according to claim 23, the service connections being used for the transferring of data only.

26. The method according to claim 23, the service connections being used for the transferring of both messages and data.

27. The method according to claim 21, where in the destroying is initiated by the I/O resource manager.

28. The method according to claim 21, wherein the destroying is initiated by the I/O unit.

29. The method according to claim 28, wherein the destroying is initiated when the at least one I/O controller decides to abandon use of the service connections.

30. The method according to claim 28, wherein the destroying is initiated when the I/O adapter detects errors on the service connection.

31. The method according to claim 21, wherein the creating includes:
   determining a message queue size of a message queue in the I/O unit, the message queue capable of buffering messages transferable between one of the at least one I/O controller and one of the at least one initiating unit;
   determining a data queue size of a data queue in the I/O unit, the data queue capable of buffering data transferable between the one of the at least one I/O controller and the one of the at least one initiating unit; and
   sending the message queue size, the data queue size, and an initiating unit identification for the one of the at least one initiating unit to the one of the at least one I/O controller.

32. A system for interfacing at least one Input/Output (I/O) controller to a channel-based switched fabric comprising:
   at least one I/O controller;
   at least one initiating unit connected to a channel-based switched fabric;
   at least one channel adapter, the at least one channel adapter allowing connection of the at least one I/O controller to a channel-based switched fabric, the at least one channel adapter supporting transferring of at least one of messages and data between the at least one I/O controller and the at least one initiating unit; and
   a physical interface between the at least one I/O controller and the at least one channel adapter, the physical interface allowing transfer of command primitives that communicate information between the at least one I/O controller and the at least one channel adapter via the physical interface.

33. The system according to claim 32, wherein the channel adapter is part of an I/O unit.

34. The system according to claim 32, the channel adapter further comprising a unit management service (UMS), the UMS managing at least one of initialization operations, discovery operations, and connection configuration operations related to at least one of the at least one I/O controller and the adapter.

35. The system according to claim 32, the channel adapter further comprising a message and data service (MDS), the MDS performing the transferring of at least one of messages and data between the at least one I/O controller and at least one initiating unit.

36. An Input/Output (I/O) unit comprising:
   at least one I/O controller;
   at least one channel adapter, the at least one channel adapter allowing connection of the at least one I/O controller to a channel-based switched fabric, the at least one channel adapter supporting transferring of at least one of messages and data between the at least one I/O controller and at least one initiating unit connected to a channel-based switched fabric; and
   a physical interface between the at least one I/O controller and the at least one channel adapter, the physical interface allowing transfer of command primitives that communicate information between the at least one I/O controller and the at least one channel adapter via the physical interface.

37. The unit according to claim 36, the channel adapter further comprising a unit management service (UMS), the UMS managing at least one of initialization operations, discovery operations, and connection configuration operations related to at least one of the at least one I/O controller and the adapter.

38. The unit according to claim 36, the channel adapter further comprising a message and data service (MDS), the MDS performing the transferring of at least one of messages and data between the at least one I/O controller and at least one initiating unit.

* * * * *